US012789125B2

(12) United States Patent
Krull

(10) Patent No.: US 12,789,125 B2
(45) Date of Patent: Nov. 10, 2026

(54) FILTER CARTRIDGE INCLUDING U-SHAPED CANTED INLET FRAME; FILTER SYSTEM INCLUDING SAME

(71) Applicant: Baldwin Filters, Inc., Cleveland, OH (US)

(72) Inventor: Timothy L. Krull, Kearney, NE (US)

(73) Assignee: Baldwin Filters, Inc., Cleveland, OH (US)

( * ) Notice: Subject to any disclaimer, the term of this patent is extended or adjusted under 35 U.S.C. 154(b) by 377 days.

(21) Appl. No.: 18/523,114

(22) Filed: Nov. 29, 2023

(65) Prior Publication Data

US 2024/0091691 A1 Mar. 21, 2024

Related U.S. Application Data

(63) Continuation of application No. PCT/US2022/032820, filed on Jun. 9, 2022.

(60) Provisional application No. 63/210,134, filed on Jun. 14, 2021.

(51) Int. Cl.

| | |
|---|---|
| ***B01D 46/00*** | (2022.01) |
| ***B01D 27/08*** | (2006.01) |
| ***B01D 46/12*** | (2022.01) |
| ***B01D 46/64*** | (2022.01) |

(52) U.S. Cl.

CPC ......... *B01D 46/0005* (2013.01); *B01D 27/08* (2013.01); *B01D 2201/304* (2013.01); *B01D 2271/02* (2013.01)

(58) Field of Classification Search

CPC ................ B01D 46/0005; B01D 27/08; B01D 2201/304; B01D 2271/02; B01D 46/0002; B01D 2275/206; B01D 46/64; B01D 46/12

USPC ........................... 55/490, 495, 497, 502, 511

See application file for complete search history.

(56) References Cited

U.S. PATENT DOCUMENTS

| | | | |
|---|---|---|---|
| 6,312,489 | B1 | 11/2001 | Ernst et al. |
| 8,034,145 | B2 | 10/2011 | Boehrs et al. |
| 8,277,532 | B2 | 10/2012 | Reichter et al. |
| 8,292,983 | B2 | 10/2012 | Reichter et al. |

(Continued)

FOREIGN PATENT DOCUMENTS

| | | | |
|---|---|---|---|
| DE | 202006007073 | U1 | 9/2007 |
| DE | 202006020287 | U1 | 3/2008 |

(Continued)

*Primary Examiner* — Frank M Lawrence, Jr.

(74) *Attorney, Agent, or Firm* — Reinhart Boerner Van Deuren P.C.

(57) ABSTRACT

A filter system and a filter cartridge for use in the filter system is provided. The filter cartridge includes a primary media pack, a precleaner media and a housing engagement member. The primary media pack has an outer perimeter and opposite first and second primary flow faces. The precleaner media has an outer perimeter and opposite first and second precleaner flow faces. The first precleaner flow face extends in a first plane parallel to and adjacent to the first primary flow face of the primary media pack. The second precleaner flow face extends in a second plane non-parallel to the first precleaner flow face and the first plane. The housing engagement member surrounds, at least in part, the primary media pack and surrounds, at least in part, the precleaner media. The housing engagement member includes a seal portion and a seal support portion.

21 Claims, 17 Drawing Sheets

(56) References Cited

U.S. PATENT DOCUMENTS

| | | | |
|---|---|---|---|
| 8,357,219 | B2 | 1/2013 | Boehrs et al. |
| 8,480,779 | B2 | 7/2013 | Boehrs et al. |
| 8,496,723 | B2 | 7/2013 | Reichter et al. |
| 8,636,820 | B2 | 1/2014 | Reichter et al. |
| 8,709,119 | B2 | 4/2014 | Reichter et al. |
| 8,840,699 | B2 | 9/2014 | Bruce et al. |
| 8,906,128 | B2 | 12/2014 | Reichter et al. |
| 9,120,047 | B2 | 9/2015 | Boehrs et al. |
| 9,180,399 | B2 | 11/2015 | Reichter et al. |
| 9,527,023 | B2 | 12/2016 | Reichter et al. |
| 9,795,911 | B2 | 10/2017 | Reichter et al. |
| 9,937,455 | B2 | 4/2018 | Boehrs et al. |
| 10,315,144 | B2 | 6/2019 | Reichter et al. |
| 10,421,034 | B2 | 9/2019 | Reichter et al. |
| 10,427,083 | B2 | 10/2019 | Boehrs et al. |
| 10,512,868 | B2 | 12/2019 | Adamek et al. |
| 10,556,201 | B2 | 2/2020 | Reichter et al. |
| 10,603,618 | B2 | 3/2020 | Boehrs et al. |
| 10,864,475 | B2 | 12/2020 | Reichter et al. |
| 10,954,899 | B2 | 3/2021 | Kaufmann et al. |
| 2002/0170856 | A1* | 11/2002 | Jaroszczyk ............ B01D 29/54 210/493.5 |
| 2006/0091064 | A1 | 5/2006 | Brown et al. |
| 2013/0327005 | A1* | 12/2013 | Menssen ............ B01D 46/2414 55/502 |
| 2015/0007732 | A1 | 1/2015 | Hasenfratz et al. |
| 2019/0381440 | A1 | 12/2019 | Krull |
| 2020/0114292 | A1 | 4/2020 | Reichter et al. |
| 2020/0114296 | A1 | 4/2020 | Boehrs et al. |
| 2020/0171419 | A1 | 6/2020 | Adamek et al. |
| 2020/0179862 | A1 | 6/2020 | Reichter et al. |
| 2020/0206671 | A1 | 7/2020 | Boehrs et al. |
| 2020/0324237 | A1* | 10/2020 | Moers .................... B01D 45/16 |

FOREIGN PATENT DOCUMENTS

| | | | |
|---|---|---|---|
| DE | 202007002786 | U1 | 6/2008 |
| DE | 102011078057 | A1 | 1/2013 |
| EP | 3721967 | A1 | 10/2020 |
| JP | 2012076015 | A | 4/2012 |

* cited by examiner

FILTER CARTRIDGE INCLUDING U-SHAPED CANTED INLET FRAME; FILTER SYSTEM INCLUDING SAME

CROSS-REFERENCE TO RELATED PATENT APPLICATIONS

This patent application is a continuation of co-pending U.S. PCT Patent Application No. PCT/US2022/032820, which designated the United States, which was filed Jun. 9, 2022, and which claims the benefit of U.S. Provisional Patent Application No. 63/210,134, filed Jun. 14, 2021, the entire teachings and disclosure each of which are incorporated herein by reference thereto.

FIELD OF THE INVENTION

This invention generally relates to filter systems and particularly filter systems that include replaceable filter cartridges and particularly to frames and seal components for sealing the replaceable filter cartridge with a reusable filter housing.

BACKGROUND OF THE INVENTION

Air streams can carry contaminant material therein. It is often desirable to filter these contaminants from the air stream before the air enters a particular system or operation, such as in the case of combustion air entering an engine in a motor vehicle or other power generation equipment.

In filtering systems where a replaceable filter cartridge is inserted into a filter housing, sealing of the filter cartridge within the filter housing is extremely important. In order to effectively filter out contaminants from the air stream as it passes through the filter cartridge and the housing, the seal between the filter cartridge and the housing should be airtight. If not, unfiltered air and dislodged contaminants can pass through gaps between the filter cartridge and the filter housing and enter the system.

Some types of filtering systems are known to create axial sealing forces when a gasket of the filter element is axially compressed under a clamping force created between a filter housing lid and a filter housing body in a closed position. It is desirable to improve upon the known unidirectional sealing forces to improve the overall sealing between the filter element and the filter housing, and thus improve the overall filtering effectiveness of the unit.

To increase filter life and decrease maintenance intervals, it is desirable to increase the particulate holding capacity of filter cartridges.

The present disclosure provides improvements over the current state of the art.

BRIEF SUMMARY OF THE INVENTION

New and improved filter systems and filter cartridges for used in filter systems are provided.

In an example, a filter cartridge including a primary media pack, a precleaner media and a housing engagement member is provided. The primary media pack has an outer perimeter and opposite first and second primary flow faces. The precleaner media has an outer perimeter and opposite first and second precleaner flow faces. The first precleaner flow face extends in a first plane parallel to and adjacent to the first primary flow face of the primary media pack. The second precleaner flow face extends in a second plane non-parallel to the first precleaner flow face and the first plane. The housing engagement member surrounds, at least in part, the primary media pack and surrounds, at least in part, the precleaner media. The housing engagement member includes a seal portion and a seal support portion.

The filter cartridge may define a central axis that is generally aligned with the flow of fluid through the primary media pack. In one example, the central axis is orthogonal to the opposed first and second primary flow faces.

As used herein, one component that surrounds another can be axially offset from one another such that the surrounded component need not be axially inserted into the surrounding component.

In one example, the filter cartridge includes a frame body. The frame body includes a perforated base located between the first primary flow face the first precleaner flow face. The frame body includes a first wall extending around the precleaner media. The frame body is affixed to the housing engagement member.

In one example, the seal support portion is arranged along a third plane that extends at an angle to the first and second primary flow faces and at an angle to the first plane.

In one example, the third plane is parallel to the second plane.

In one example, the frame body is axially received within the housing engagement member.

In one example, the seal support portion is a first annular flange. A second wall extends away from the first flange. The first wall of the frame body is axially received within the second wall. The first and second walls are annular walls. The second wall is spaced outward from the first wall forming an annular trough therebetween.

In one example, a sealant is applied between the frame body and housing engagement member operably sealing the first wall to the second wall preventing fluid flow between the first and second walls.

In one example, a second annular flange attaches to the second wall and extends inward from the second wall. A third annular flange attaches to the first wall and extends outward from the first wall. The second annular flange axially abuts the first annular flange.

In one example, the first, second and third annular flanges are radially directed flanges.

In one example, the sealant is applied between the second and third annular flanges.

In one example, the first and second annular flanges are axially spaced from one another.

In one example, the first wall includes spaced apart first and second wall segments and spaced apart third and fourth wall segments, the third and fourth wall segments extend between the first and second wall segments. The first wall segment extends axially away from the primary media pack a first distance. The second wall segment extends axially away from the primary media pack a second distance greater than the first distance. The third and fourth wall segments increase in axial extension when moving from the first wall segment towards the second wall segment.

In one example, for the first wall, the first and second wall segments are generally parallel and the third and fourth wall segments are generally parallel. They need not be perfectly parallel nor do the wall segments need to be perfectly straight to be generally parallel. For example, the wall segments could extend at an angle of less than 10 degrees and still be generally parallel.

In one example, for the first wall, the first and second wall segments are generally perpendicular to the third and fourth wall segments such that the first wall generally defines a rectangular periphery.

In one example, the second annular wall includes spaced apart first and second wall segments and spaced apart third and fourth wall segments. The third and fourth wall segments extend between the first and second wall segments. One of the third or fourth wall segments includes an outward extending region. The first annular flange has an outward extending notch proximate the outward extending region.

In one example, for the second wall, the first and second wall segments are generally parallel and the third and fourth wall segments are generally parallel.

In one example, for the second wall, the first and second wall segments are generally perpendicular to the third and fourth wall segments such that the first wall generally defines a rectangular periphery.

In one example, the seal of the housing engagement member is positioned, at least in part, outward of the notch.

In one example, the outward extending region is formed by spaced apart fifth and sixth wall segments that extend outward from the third wall segment as well as a seventh wall segment extending between the fifth and sixth wall segments.

In one example, the fifth and sixth wall segments are parallel to one another and generally perpendicular to the first primary flow face and the first plane.

In one example, the frame body includes an outward extending tab. The radially extending tab extends into the region.

In one example, the tab extends from the second wall.

In one example, the annular trough has a uniform axial depth around the primary media pack perimeter.

In an example a filter system is provided. The filter system includes a filter housing having a housing body defining an internal cavity. The housing body has a sealing surface extending around the internal cavity. The housing body has an axially extending tooth positioned radially inward of the sealing surface. The tooth extends axially away from the internal cavity axially past the sealing surface. A filter cartridge of the examples above is positioned within the cavity of the housing body. The seal of the filter cartridge seals with the sealing surface of the filter housing. The primary media pack is positioned, at least in part, within the internal cavity.

In one example, the precleaner media is positioned, at least in part, external of the housing body.

In an example, the tooth of the filter housing is axially received within the region.

In another example, a filter cartridge including a filter media pack and a housing engagement member is provided. The filter media pack has a first flow face and a second flow face. The housing engagement member surrounds the filter media pack. The housing engagement member includes first and second annular sidewalls that form a trough therebetween. The trough has a constant depth between a mouth and a bottom of the trough at all locations. The trough has an enlarged region wherein the bottom of the trough has a greater width dimension than other portions of the bottom of the trough.

In one example, the first annular sidewall is spaced outward from the second annular sidewall.

In one example, a super majority of the trough reduces in width between the first and second annular sidewalls when moving from the mouth thereof towards the bottom thereof.

In one example, the housing engagement member includes a seal support and a seal mounted to the seal support. The seal support defines a first plane and the bottom of the trough defines a second plane. The first and second planes are parallel to one another. The depth of the trough being defined by the spacing between the first and second planes.

In one example, the width of the bottom of the trough defining the enlarged region is measured parallel to and within the second plane.

In one example, the bottom of the trough proximate the enlarged region is planar with the second plane.

In one example, the enlarged region is formed by a pair of sidewalls that extend orthogonal to and between the first and second plane. The pair of sidewalls are spaced apart and parallel to one another.

In one example, a bottom wall defines the bottom of the trough at the enlarged region and extends generally parallel to the second plane and an end wall extends between the first and second planes and orthogonal to the pair of sidewalls.

In one example, the seal support is a flange portion that extends radially outward from the first annular sidewall. The first annular sidewall is spaced outward from the second annular sidewall.

In one example, the first and second annular sidewalls are generally connected together proximate the bottom of the trough.

In one example, the first and second annular sidewalls are formed as a single continuous body formed from a single continuous piece of material.

In one example, the annular sidewalls each have for wall segments. The annular sidewalls have a generally rectangular profile.

In one example, a first end cap is secured to a first end of the filter media pack. The first end extends between the first and second flow faces. The second end cap is secured to a second end of the filter media pack, opposite the first end. The second end extends between the first and second flow faces. The housing engagement member is positioned outward of the first and second end caps.

In one example, the housing engagement surrounds an opening, directly or indirectly, through which the filter media pack extends. The end caps are located within the opening as well.

In one example, the first end cap includes an outward extending abutment that includes an abutment face that faces one of the first and second flow faces. The second end cap includes an outward extending abutment that includes an abutment face that faces the one of the first and second flow faces. The second annular sidewall axially abuts the abutment of the first end cap and the abutment of the second end cap.

The outward extending abutment extends outward away from a side of the filter media pack.

In one example, the abutment of the first end cap and the abutment of the second end cap are spaced a same distance from the one of the first and second flow faces.

In one example, the second annular sidewall defines a generally rectangular profile having first and second sidewall segments that are parallel to one another and third and fourth sidewall segments that are parallel to one another and generally orthogonal to the first and second sidewall segments. The first and second sidewall segments have a constant height between the third and fourth sidewall segments. The third and fourth sidewall segments have an increasing height when moving from the first sidewall segment to the second sidewall segment.

In one example, a bottom edges of the first, second, third and fourth sidewall segments define a first plane that is generally parallel to the first and second flow faces. The bottom of the trough defines a second plane. The second plane is non-parallel to the first plane and non-parallel to the first and second flow faces.

In one example, the filter media pack has a generally rectangular periphery. The first, second, third and fourth sidewall segments of each of the first and second annular sidewalls are parallel to a corresponding side of the rectangular periphery of the filter media pack.

In one example, the housing engagement member includes an annular wall member that extends outward relative to the second annular sidewall. The annular wall member and the second annular sidewall form a gap with the filter media pack. An adhesive is provided within the gap to secure the housing engagement member to the filter media pack. The annular wall member define an enlarged mouth to the gap.

In one example, the enlarged mouth has a width measured perpendicular to the depth of the trough. The width is greater than a width between the second annular sidewall and an adjacent portion of the media pack or an adjacent portion of an end cap. These widths also being measured perpendicular to the depth of the trough.

In one example, the gap is closed off between the filter cartridge and second annular sidewall by a piece of shutoff tape.

In one example, the shutoff tape is spaced away from the annular wall member such that a portion of the gap is formed axially between the shutoff tape and the annular wall member.

In one example, a first support grate adjacent the first flow face is provided. A second support grate adjacent the second flow face is provided. The second support grate is generally U-shaped and receives at least a portion of the filter media pack therein with the second support grate overlapping at least three sides of the filter media pack including the second flow face.

In one example, the first and second end caps are cup shaped receiving the first and second ends of the filter media pack therein. One end of the second support grate being received in the first end cap and the other end of the second support grate being received in the second end cap.

In one example, the first support grate includes a first and a second mounting tab extending axially away from one another. The first and second mounting tabs are located at opposed ends of the first support grate. The first end cap includes a first mounting receiver receiving the first mounting tab therein. The second end cap includes a second mounting receiver receiving the second mounting tab therein.

In one example, the first end cap is secured to the first end of the filter media pack with adhesive and the second end cap is secured to the second end of the filter media pack with adhesive. The adhesive secures the first and second end caps to the filter media pack not engaging the first support grate.

In one example, the first and second planes are canted relative to the first and second flow faces in a non-parallel and non-orthogonal orientation relative thereto. As such two portions of the trough bottom formed between the first and second annular sidewalls are canted relative to the inlet and outlet flow faces.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
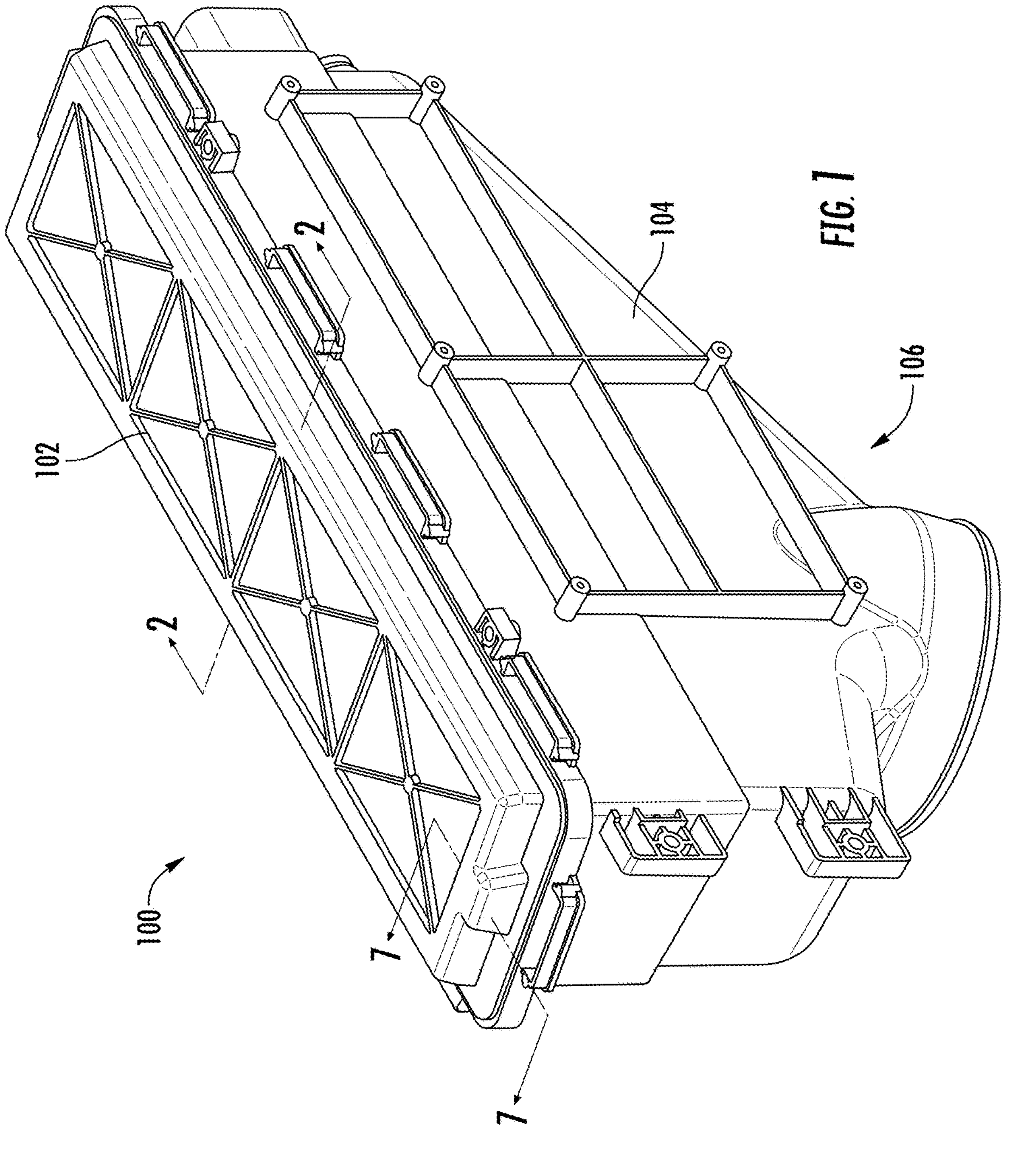
FIG. 1 is a partial illustration of a filter system including a housing body and a replaceable filter cartridge installed therein.
Figure 2:
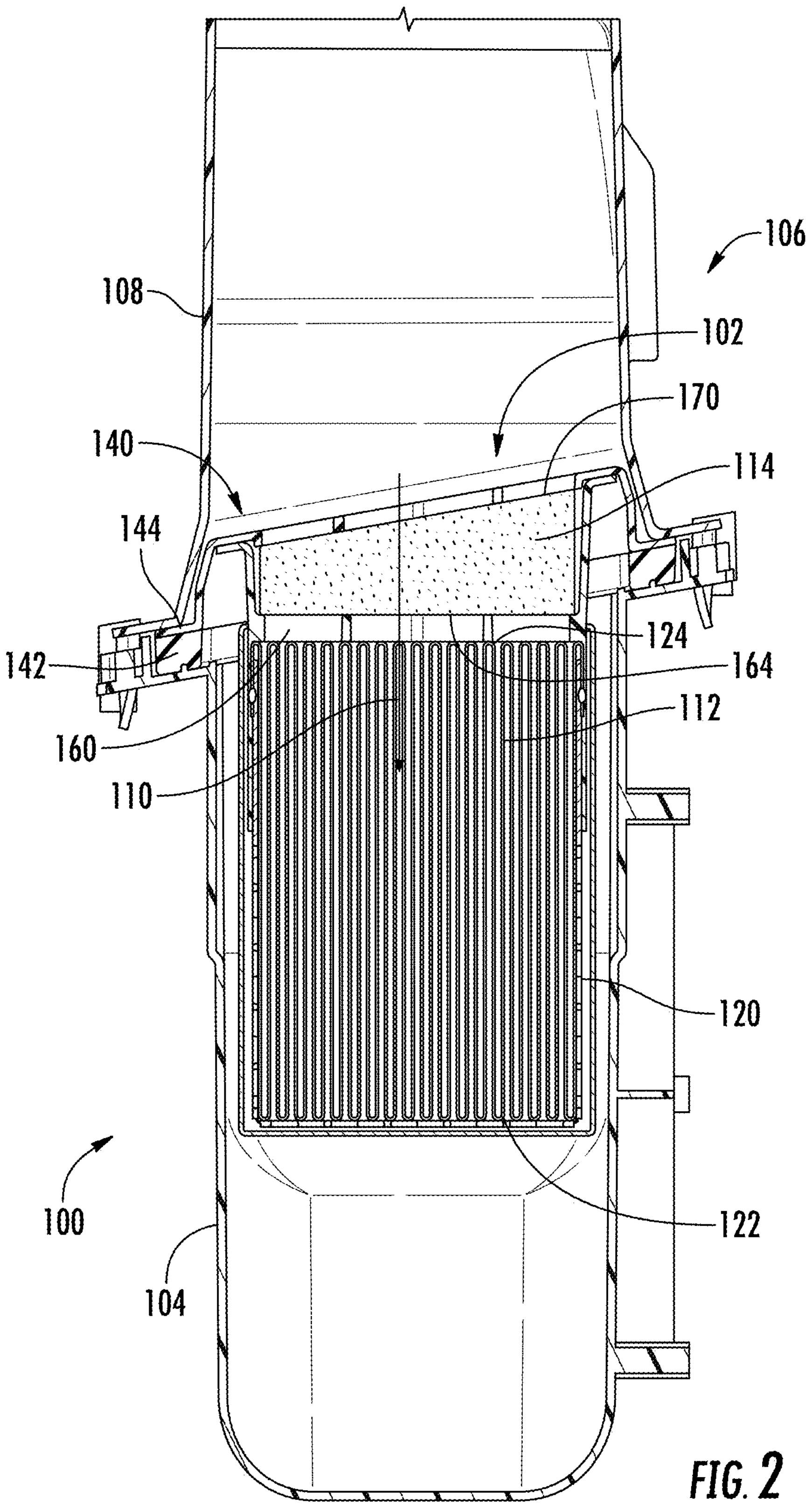
FIG. 2 is a cross-sectional illustration of the filter system including the housing body, a filter cartridge and a housing cover.

FIG. 1 illustrates a portion of a filter system 100. In FIG. 1 a filter cartridge 102 is illustrated mounted within a housing body 104 of a filter housing 106. FIG. 2 is a cross-sectional illustration of the filter system 100 including a housing cover 108 of the filter housing 106. In this example, the housing cover 108 provides a dirty fluid inlet and the housing body 104 provides a clean fluid outlet. As such, fluid flow, such as air flow, flows through the filter cartridge as illustrated by arrow 110.

The filter cartridge 102 is a repair component that can be removed from the filter housing 106 and replaced with a clean filter cartridge when the current filter cartridge becomes spent.

Figure 3:
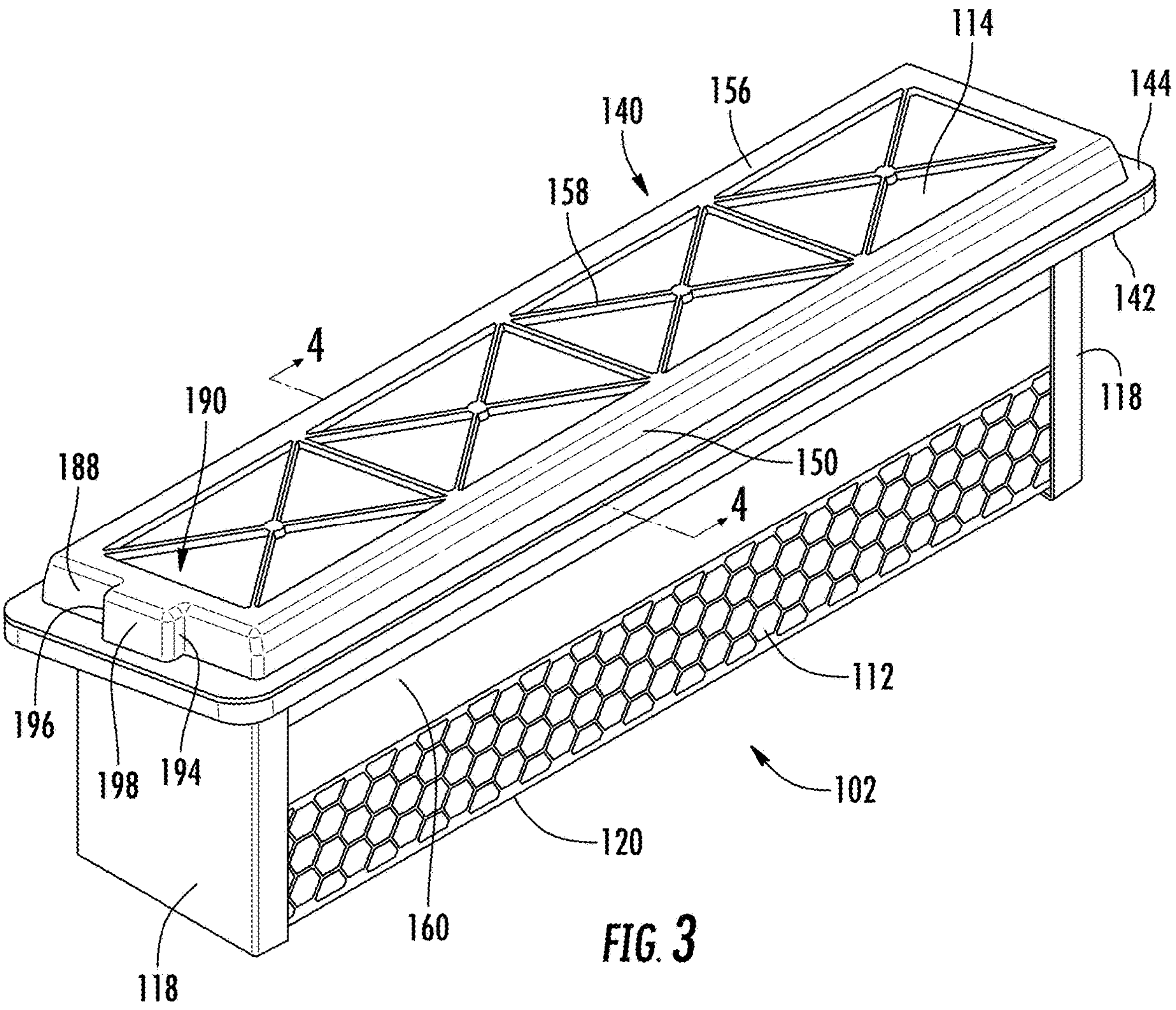
FIG. 3 is a perspective illustration of the filter cartridge removed from the filter housing.

FIG. 3 illustrates the filter cartridge 102 removed from the filter housing 106. The filter cartridge 102 generally includes a primary filter media pack 112 and a precleaner media 114. The precleaner media increases the impurity holding capacity of the filter cartridge 102. However, the precleaner media 114 may not be included in some embodiments.

The filter cartridge 102 is generally rectangular in shape. In one example, the primary filter media pack 112 is formed from pleated filter media while the precleaner media 114 is a block of foam. However, other filter medias are contemplated. For example, the primary filter media pack 112 could be a block of filter media, fluted filter media, foam filter media etc. The similarly, the precleaner media 114 could be pleated media, a block of filter media, fluted media, etc.

The filter cartridge 102 includes end caps 118 attached at opposed ends of the primary filter media pack 112. These end caps 118 seal the ends of the primary filter media pack 112. The end caps 118 may be secured to the primary filter media pack 112 with an adhesive 119, such as in the example FIG. 5. In some examples, the end caps 118 are cup shaped preformed end caps that are adhesively secured to the opposed ends of the primary filter media pack. The adhesive can be a potting compound, urethane, foamed urethane or other adhesive that properly secures the end caps and/or seals the ends of the filter media of the primary filter media pack 112. In other examples, the end caps 118 could be molded in place to the primary filter media pack 112.

In this example, an optional outlet support grate 120 is attached to the primary filter media pack 112. The outlet support grate 120 is perforate to allow for fluid flow therethrough. In this example, the outlet support grate 120 is generally U-shaped (see for example FIG. 4) and extends generally around three sides of the primary filter media pack 112. In this example, the outlet support grate extends across outlet flow face 122 but does not extend across inlet flow face 124. Further, the outlet support grate 120 extends along opposed sides 126, 128 that extend axially between the outlet and inlet flow faces 122, 124.

In this example, a portion of filter media of the primary filter media pack 112 wraps around the free ends of support grate 120 that extends along the sides of the primary filter media pack 112.

Figure 4:
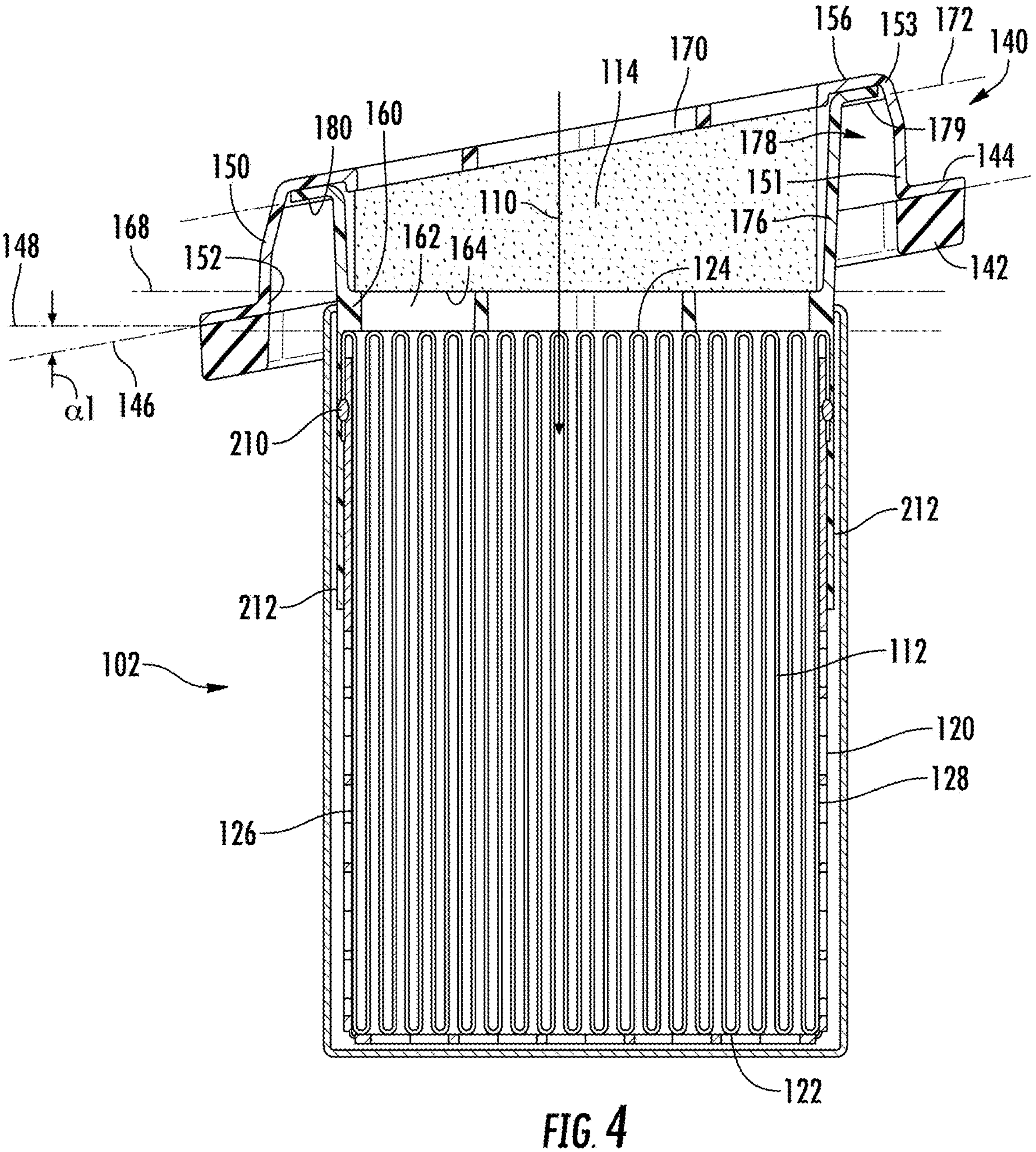
FIG. 4 is a cross-sectional illustration of the filter cartridge.
Figure 6:
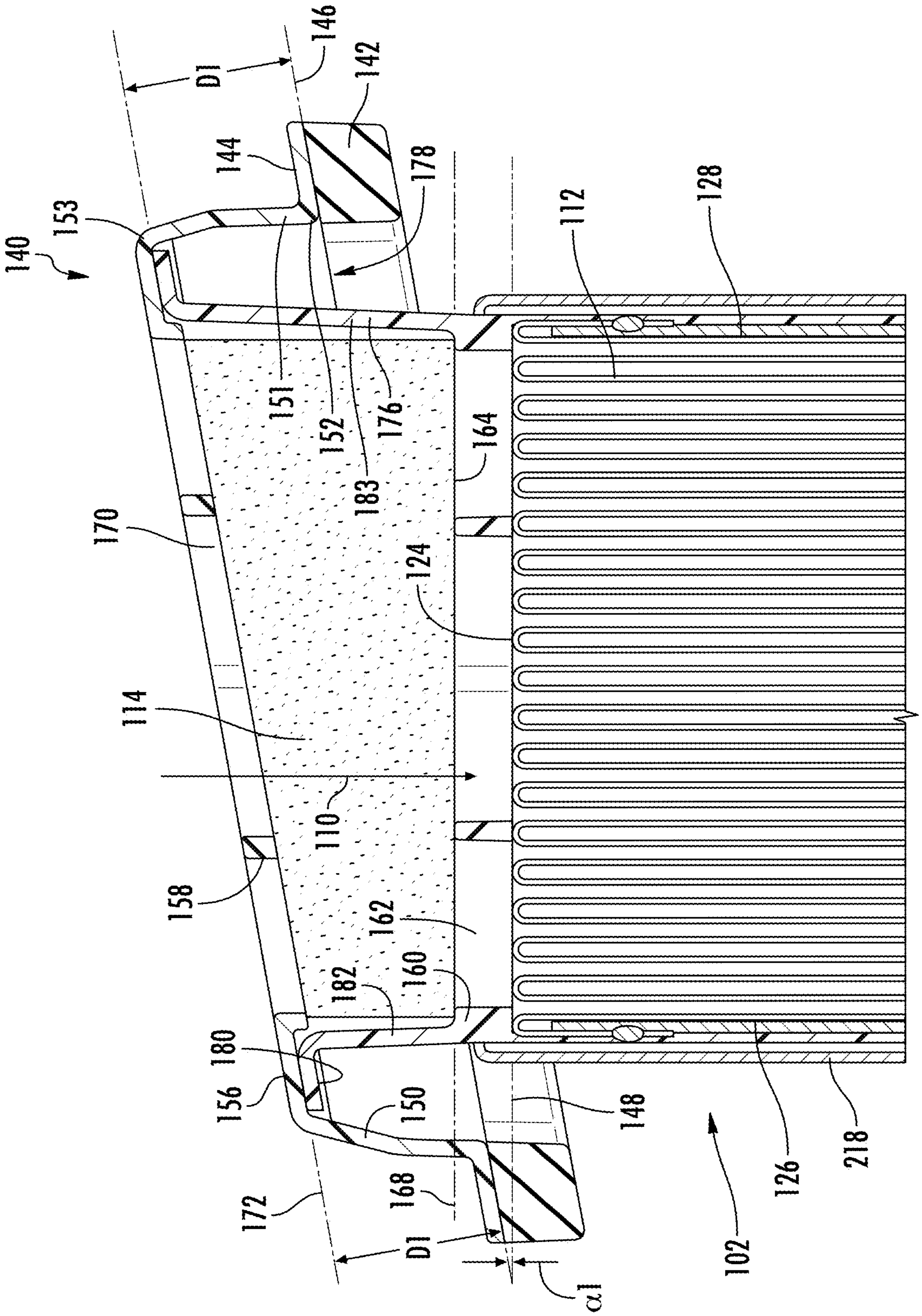
FIG. 6 is an enlarged cross-sectional illustration of the filter cartridge of FIG. 4.

A housing engagement member 140 is operably attached to the primary filter media pack 112. The housing engagement member 140 includes a seal portion 142, illustrated in the form as a preformed gasket, and a seal support portion 144. As illustrated in FIGS. 4 and 6, the seal portion 142 and seal support portion 144 are positioned radially outward of and extends around the outer periphery of the primary filter media pack 112.

Figure 7:
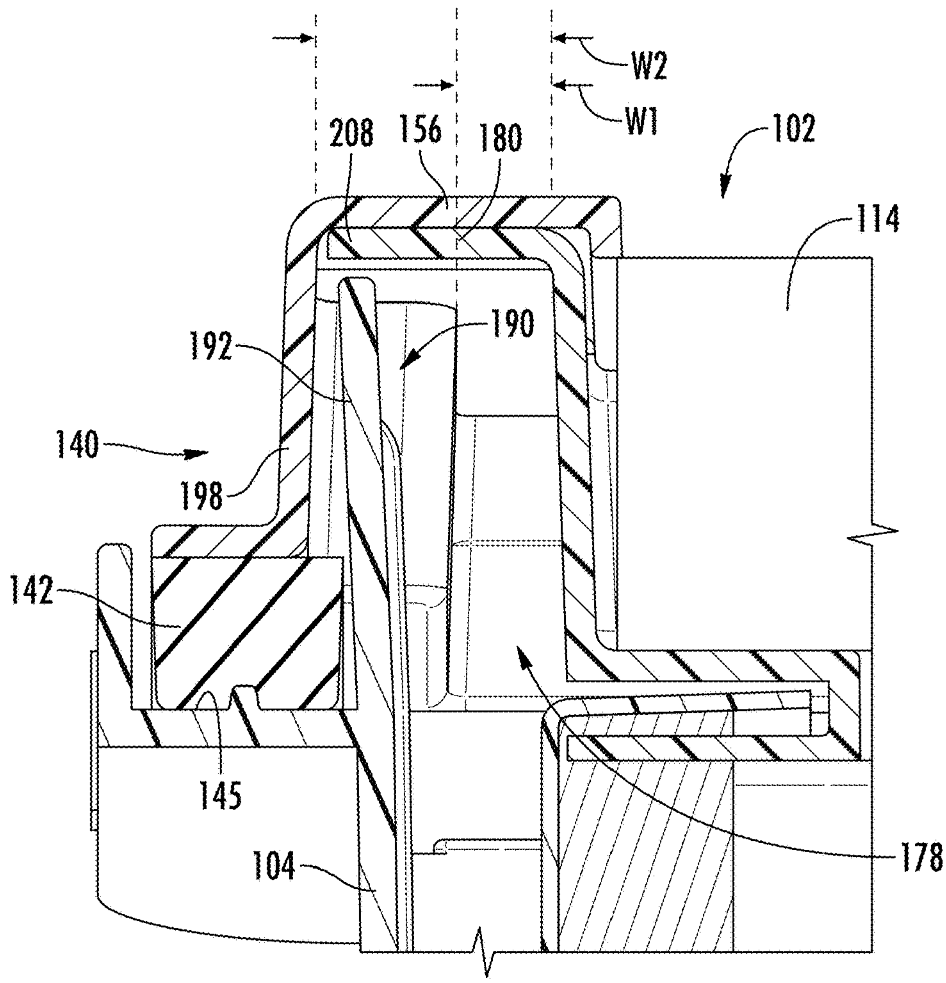
FIG. 7 is a cross-sectional illustration of a portion of the filter system illustrating a tooth portion of the housing body extending into a region of the filter cartridge.

Seal portion 142 axially seals with seal surface 145 of housing body 104 (see FIG. 7).

In this example, the seal support portion 144 is a radially directed annular flange. The seal support portion is arranged along a plane 146 that is non-parallel to a plane 148 that is parallel to the inlet flow face 124. As such, plane 146 extends at a non-zero angle $\alpha 1$. In this example, the outlet flow face 122 is parallel to plane 148 and inlet flow face 124.

An annular wall 150 extends axially from seal support portion 144.

In this example, the annular wall 150 is connected at a first end 151 to a radially inner edge 152 of the annular seal support portion 144. The second end 153 of the annular wall 150 is connected a second radially directed annular flange 156. The second radially directed annular flange 156 extends radially inward relative to the annular wall 150.

With reference to FIG. 3, in this example, a grate arrangement 158 extends inward of the annular flange 156 and across an inlet flow face of the precleaner media 114.

Further, as illustrated in FIGS. 4 and 6, the precleaner media 114 is axially received, at least in part, within the annular wall 150. In this example, the annular wall 150 is spaced radially outward from the sides of the precleaner media 114.

A frame body 160 operably attaches the housing engagement member 140 to the primary filter media pack 112.

The frame body 160 includes a perforated base 162. When assembled, in this example, the perforated base 162 is positioned between the inlet flow face 124 of the primary filter media pack 112 and an outlet flow face 164 of the precleaner media 114.

Thus, precleaner media 114 is axially positioned between the housing engagement portion 140 and the frame body.

In the illustrated arrangement, the precleaner media 114 is axially positioned between grate arrangement 158 of the housing engagement portion 140 and the perforated base 162 of the frame body 160.

By providing the housing engagement portion 140 and the frame body 160 as separate components that are connected together to form a unitary body (e.g. by welding or application of adhesives, it is possible to install the precleaner media 114 between the two preformed components.

In this example, the outlet flow face 164 extends in a plane 168 that is parallel to plane 148 and thus extends at angle $\alpha 1$ to plane 146. Inlet flow face 170 of the precleaner media 114 extends in plane 172. Plane 172 extends at a non-zero angle to planes 148 and 168. In one example, plan 172 is parallel to plane 146. However, other arrangements are contemplated.

Frame body 160 includes an axially extending annular wall 176 that extends axially outward from perforated base 162 and away from the primary filter media pack 112. Annular wall 176 surrounds the precleaner media 114.

Annular wall 176 is axially received within annular wall 150. As illustrated in FIG. 4, annular wall 176 is spaced radially inward of annular wall 150 forming an annular trough 178 therebetween that extends around the outer periphery of the primary filter media pack 112. In this example, the annular trough 178 is axially offset from the primary filter media pack 112.

In this example, the axial depth D1 (see FIG. 6) of the annular trough 178 is constant at all locations around the periphery of the primary filter media pack 112. This depth is measured between a bottom of the annular trough 178 and a plane defined by the seal support flange 144.

Annular wall 150 is operably sealingly attached to annular wall 176 to prevent fluid bypass therebetween. In one example, a sealant 179 is operably provided between the annular wall 150 and annular wall 176.

In this example, a radially extending annular flange 180 extends radially outward from annular wall 176. Annular flange 180 extends generally within a plane parallel to plane 172. An axially outer face of the annular flange 180 that generally faces away from the primary filter media pack 112 abuts an inward facing face of annular flange 156. The sealant 179 may be provided between annular flange 180 and annular flange 156.

In some examples, the annular flanges 156, 180 or other adjacent components may be welded to one another to secure the components together and to operably secure the housing engagement member 140 to the frame body 160.

Figure 5:
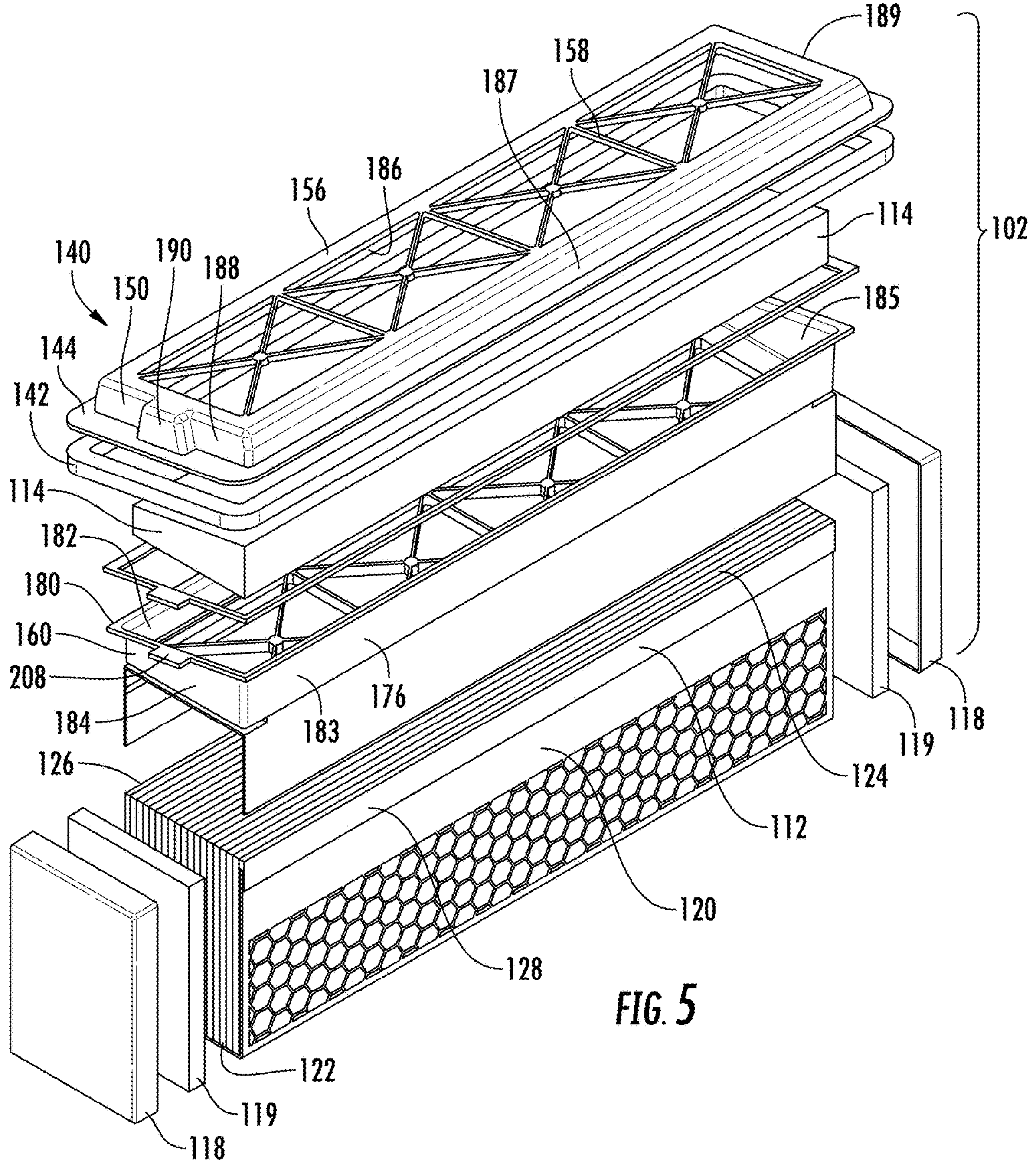
FIG. 5 is an exploded illustration of the filter cartridge of FIG. 4.

With reference to FIG. 5, annular wall 176 forms a generally rectangular profile when viewed perpendicular to flow face 124. The rectangular profile is generally formed from four sidewall segments 182-185. Sidewall segments 182, 183 are spaced apart and generally parallel. Sidewall segments 184, 185 are spaced apart and generally parallel. Sidewall segments 184, 185 extend between sidewall segments 182, 183.

In this example, sidewall segment 182 has an axial height that is less than sidewall segment 183. More particularly, sidewall segment 183 extends further away from the primary filter media pack 112 than sidewall segment 182 (see e.g. FIG. 6).

Sidewall segments 184, 185 are generally tapered such that they have an increasing height when moving from sidewall segment 182 towards sidewall segment 183. This taper generally corresponds to plane 172 and angle $\alpha 1$.

The sides of the precleaner media 114 have similar axial heights as the adjacent sidewall segment 182-185.

Annular sidewall 150 forms a generally rectangular profile and is formed from four sidewall segments 186-189. Sidewall segments 186, 187 are spaced apart and generally parallel to one another and parallel to sidewall segments 182, 183. Sidewall segments 188, 189 are spaced apart and generally parallel to one another and parallel to sidewall segments 184, 185. Sidewall segments 188, 189 extend between sidewall segments 186, 187.

Figure 8:
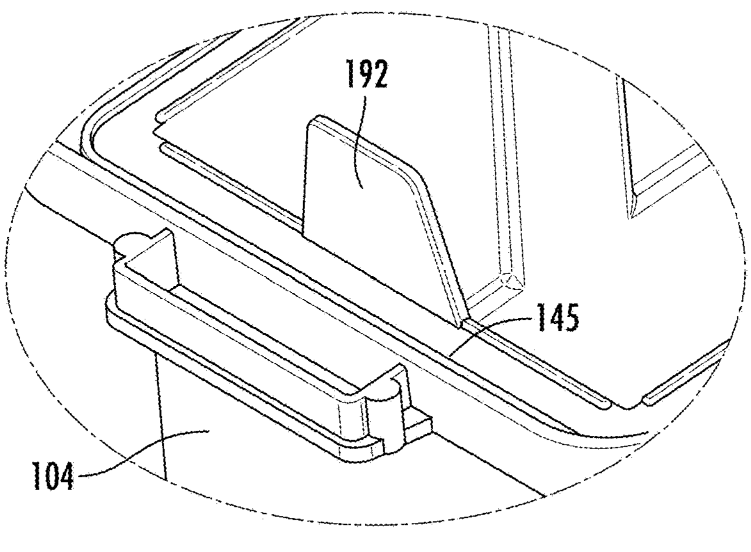
FIG. 8 is a partial illustration of the filter housing of the filter system illustrating the tooth portion.

In this example, sidewall segment 188 includes a radially bumped out region forming region 190. Region 190 is spaced radially outward from the rest of sidewall segment 188. With reference to FIGS. 7 and 8, the region 190 accepts an axially extending tooth 192 of the housing body 104 when the filter cartridge 102 is installed.

Figure 9:
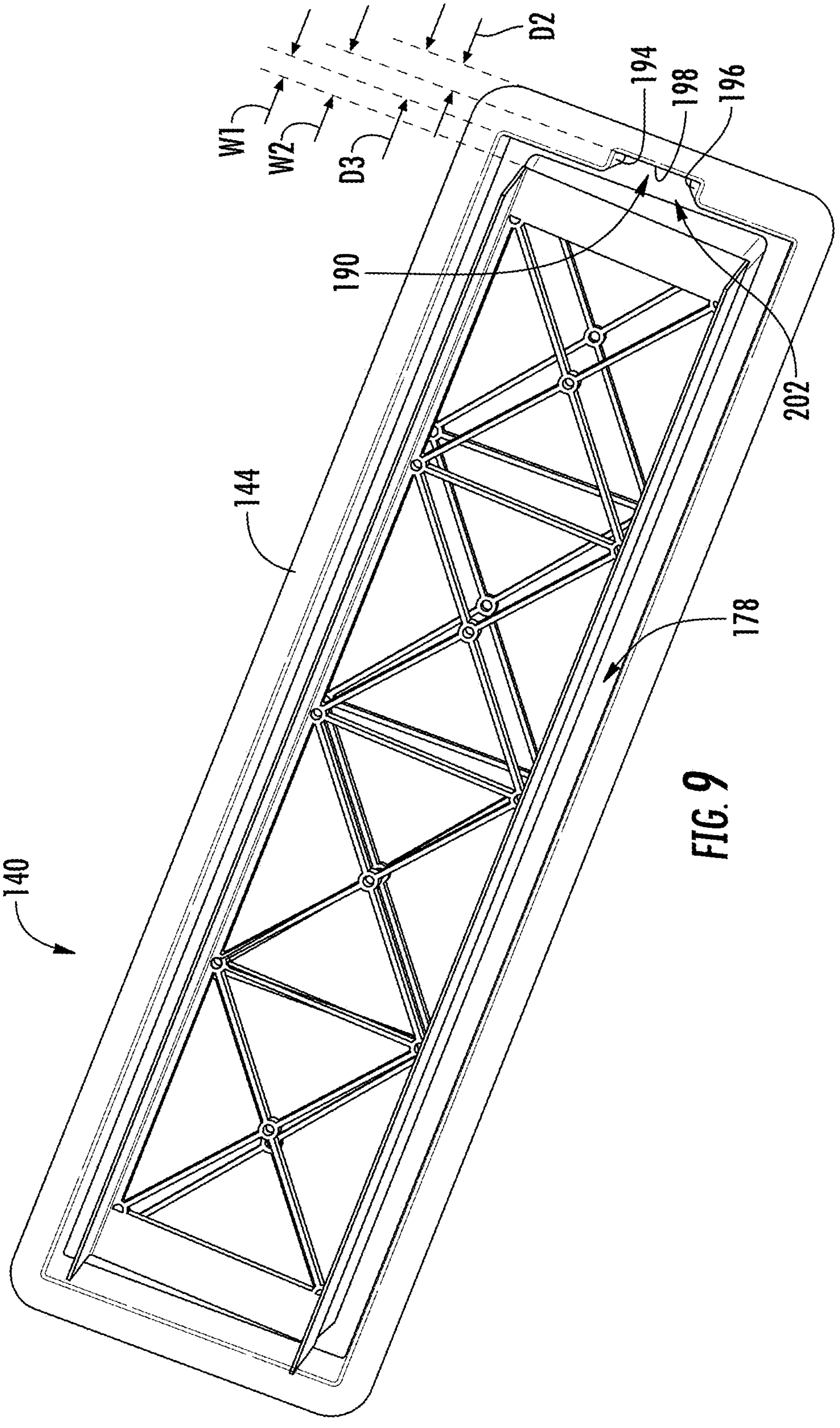
FIG. 9 is a perspective illustration a seal support member secured to a frame body of the filter cartridge of FIG. 4 illustrating the region that receives the tooth portion of the housing body.

With reference to FIGS. 3 and 9, the region 190 is formed by a pair of radially outward extending sidewall segments 194, 196 that are generally perpendicular to the rest of sidewall segment 188. These sidewall segments 194, 196, in FIG. 3, are parallel to one another and extend axially perpendicular to flow 124 and planes 148, 168. A sidewall segment 198 extends between sidewall segments 194, 196. Sidewall segment 198 is generally parallel to the rest of sidewall segment 188.

A radially outward extending portion 200 of flange 156 closes an axial end of the region 190 spaced furthest away from the primary filter media pack 112. Portion 200, in this example, is generally parallel to and axially spaced from the flange forming seal support portion 144.

The region 190 forms an outward extending notch 202 in seal support portion 144. As such, the dimension D2 of the seal support portion 144 proximate the region 190 is less than the dimension D3 of the seal support spaced away from the region 190.

The frame body 160 includes an outward extending tab 208. The tab 208 extends into region 190 when assembled.

In this example, the seal 142 is positioned outward of notch 202.

In this example, the frame body 160 is attached to the primary filter media pack 112 by an adhesive bead 210 along the sides 126, 128. In this example, the adhesive bead 210 seals side panels 212 of the frame body 160 to the portion of the filter media of the primary filter media pack 112 that is folded over the ends of the sides of support grate 120. This eliminates or reduces the likelihood of a leak path between the frame body 160 and the filter media of the primary filter media pack 112.

The folded over portion of the filter media may be a shorter pleat panel that does not extend the full distance between the opposed flow faces of the filter media pack 112.

Preferably, the adhesive bead 210 extends through the filter media and also adheres to the support grate 120. In alternative examples, a further adhesive bead may be directly applied between the side panels 212 and the support grate 120.

Figure 10:
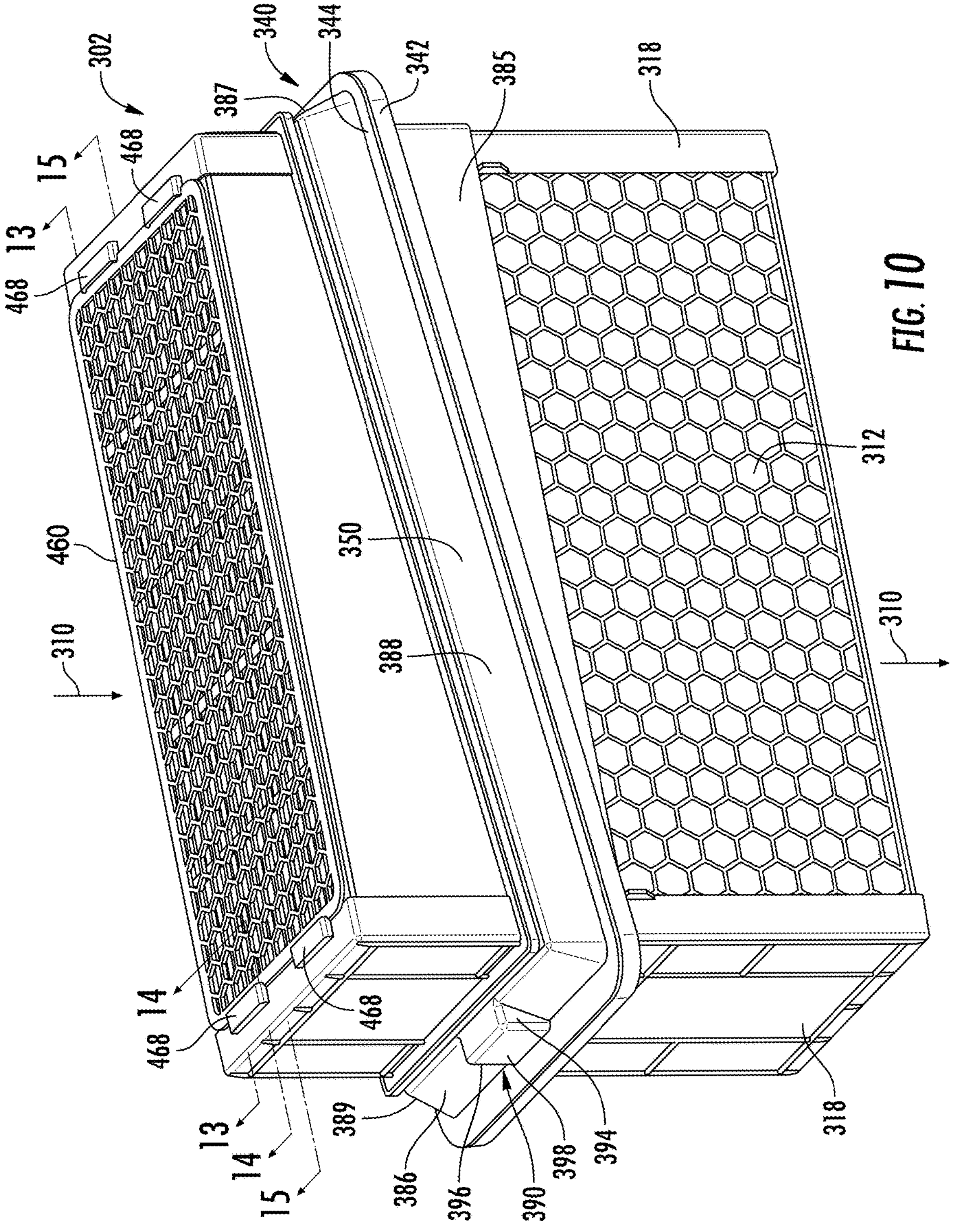
FIG. 10 is a perspective illustration of a filter cartridge according to an example that is useable in a reusable filter housing.
Figure 11:
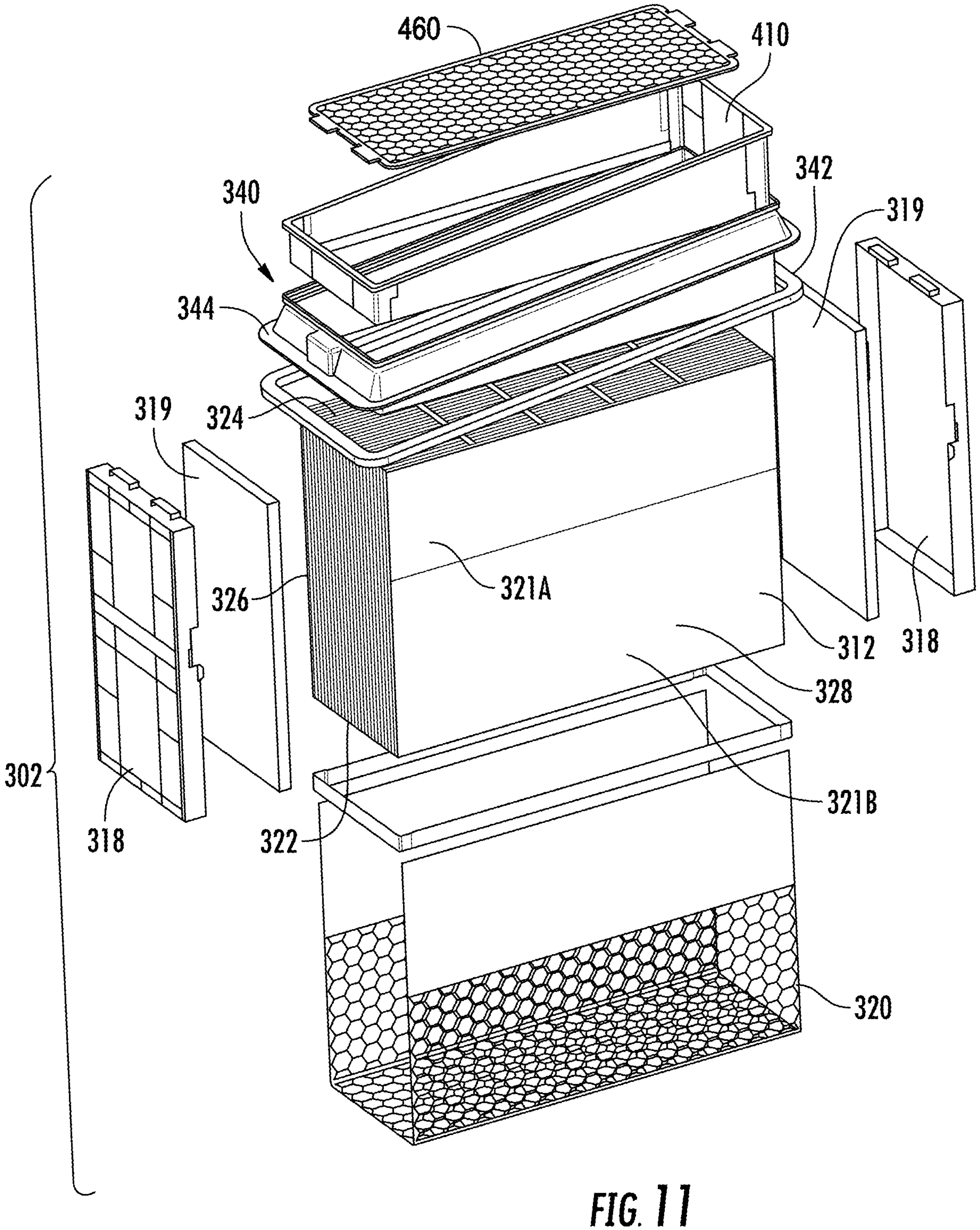
FIG. 11 is a perspective exploded illustration of the filter cartridge of FIG. 10.

With initial reference to FIGS. 10 and 11, a further filter cartridge 302 configured to be mounted within the housing body and housing cover in a similar manner as filter cartridge 102 within housing body 104 and housing cover 108 is illustrated. However, due to the configuration of the seal in this example, this filter cartridge 302 is configured to cooperate with a slightly different configuration of a housing body and housing cover.

Dirty fluid would typically flow through the filter cartridge 302 as illustrated by arrows 310.

The filter cartridge 302 is a repair component that can be removed from the filter housing and replaced with a clean filter cartridge when the current filter cartridge becomes spent.

The filter cartridge 302 generally includes a filter media pack 312 and is an example that does not include a precleaner media such as in the prior example. However, it is contemplated that a precleaner media could be incorporated.

The filter cartridge 302 is generally rectangular in shape. In one example, the filter media pack 312 is formed from pleated filter media, which may be a cellulose material but could take other forms and other filter medias are contemplated. For example, the filter media pack 312 could be a block of filter media, fluted filter media, foam filter media etc.

The filter cartridge 302 includes end caps 318 attached at opposed ends of the filter media pack 312. These end caps 318 seal the ends of the filter media pack 312. The end caps 318 may be secured to the filter media pack 312 with an adhesive 319, illustrated schematically as blocks of adhesive in FIG. 11. In some examples, the end caps 318 are cup shaped preformed end caps that are adhesively secured to the opposed ends of the filter media pack 312. The adhesive 319 can be a potting compound, urethane, foamed urethane or other adhesive that properly secures the end caps 318 and/or seals the ends of the filter media of the filter media pack 312. In other examples, the end caps 318 could be molded in place to the filter media pack 312.

In this example, an optional outlet support grate 320 is attached to the filter media pack 312. The outlet support grate 320 is perforate to allow for fluid flow therethrough. In this example, the outlet support grate 320 is generally U-shaped (see for example FIG. 11). The outlet support grate 320 extends generally around three sides of the filter media pack 312. In this example, the outlet support grate 320 extends across outlet flow face 322 but does not extend across inlet flow face 324. Further, the outlet support grate 320 extends along opposed sides 326, 328 that extend axially between the outlet and inlet flow faces 322, 324 and the end caps 318.

In this example, a portion of filter media of the filter media pack 312 wraps around the free ends of support grate 320 that extends along the sides of the filter media pack 312. This is illustrated by pleat panel 321A and 321B in FIG. 12. In this example, outer pleat panel 321A is a partial panel that does not extend entirely between inlet and outlet flow faces 324, 322. This arrangement occurs on both sides of the filter media pack 312.

A housing engagement member 340 is operably attached to the filter media pack 312. The housing engagement member 340 includes a seal portion 342, illustrated in the form as a preformed gasket, and a seal support portion 344. The seal portion 342 and seal support portion 344 are positioned radially outward of and extends around the outer periphery of the filter media pack 312.

Seal portion 342 axially seals with a seal surface of the corresponding filter housing.

In this example, the seal support portion 344 is a radially directed annular flange. The seal support portion 344 is arranged along a plane 346 that is non-parallel to a plane 348 (FIG. 13) that is parallel to the inlet flow face 324. As such, plane 346 extends at a non-zero angle β1 to inlet and outlet flow faces 324, 322. In this example, the outlet flow face 322 is parallel to inlet flow face 324.

An annular wall 350 extends axially from seal support portion 344. In this example, a majority of the annular wall 350 extends at a non-perpendicular angle relative to plan 346.

Figure 14:
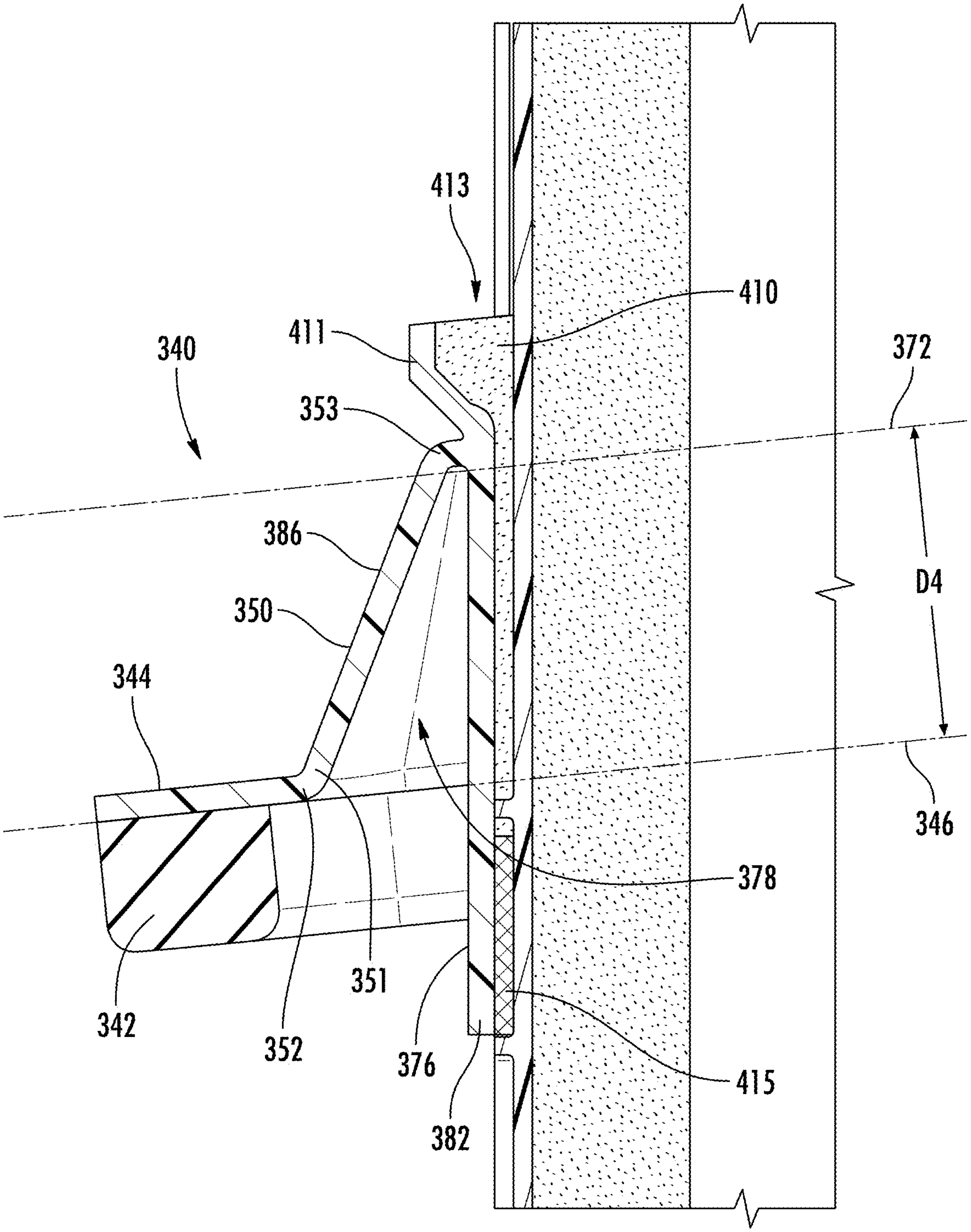
FIG. 14 is a cross-sectional illustration of the filter cartridge of FIG. 10 take about line 14-14.

In this example, with reference to FIG. 14, the annular wall 350 is connected at a first end 351 to a radially inner edge 352 of the annular seal support portion 344. The second end 353 of the annular wall 350 is connected to a second annular wall 376. The second annular wall 376 extends axially away from end 353.

Annular wall 350 and second annular wall 376 define a trough 378 therebetween.

Figure 13:
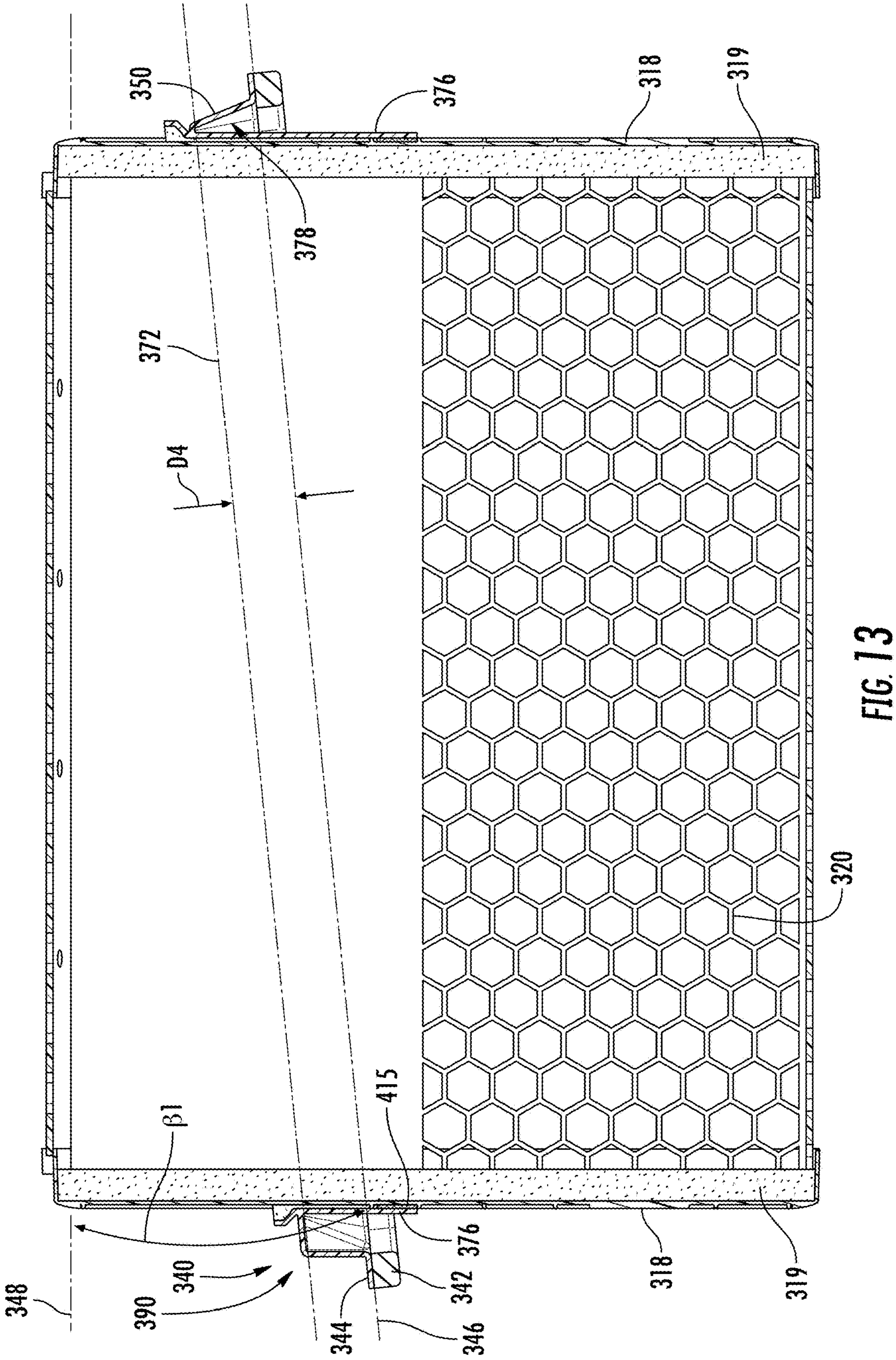
FIG. 13 is a cross-sectional illustration of the filter cartridge of FIG. 10 take about line 13-13.

In this example, both sidewalls 350 and 372 extend at non-parallel, non-perpendicular angles between planes 372 and 346 (planes 346 and 372 are illustrated in FIG. 13. Due to the tapered orientations of the sidewalls 350, 372 relative to one another, at substantially all locations, the trough 378 reduces in width when moving from a mouth thereof towards the bottom thereof. In most locations the outer sidewall 350 tapers inwards towards the inner sidewall 376.

In this example, the annular trough 378 surrounds the filter media pack 312 and is positioned axially between the outlet and inlet flow faces 322, 324 thereof.

Annular wall 376 surrounds the filter media pack 312 and is operably secured to the outer periphery of the filter media pack 312 by an adhesive 410. In some examples, the annular wall 376 may be considered a frame body. In this example, the first and second annular walls 350, 376 and seal support 344 are formed into a body that is a single continuous piece of material.

Typically, the body is a preform formed prior to being attached to the filter media pack 312 such as out of molded plastic.

In this example, like the prior example, the axial depth D4 of the annular trough 378 is constant at all locations around the periphery of the primary filter media pack 312. The depth D4 is defined by plane 346 and a second plane 372 that is defined by the bottom (e.g., proximate the intersection of the annular walls 350 and 376 in FIG. 14) of trough 378.

Figure 17:
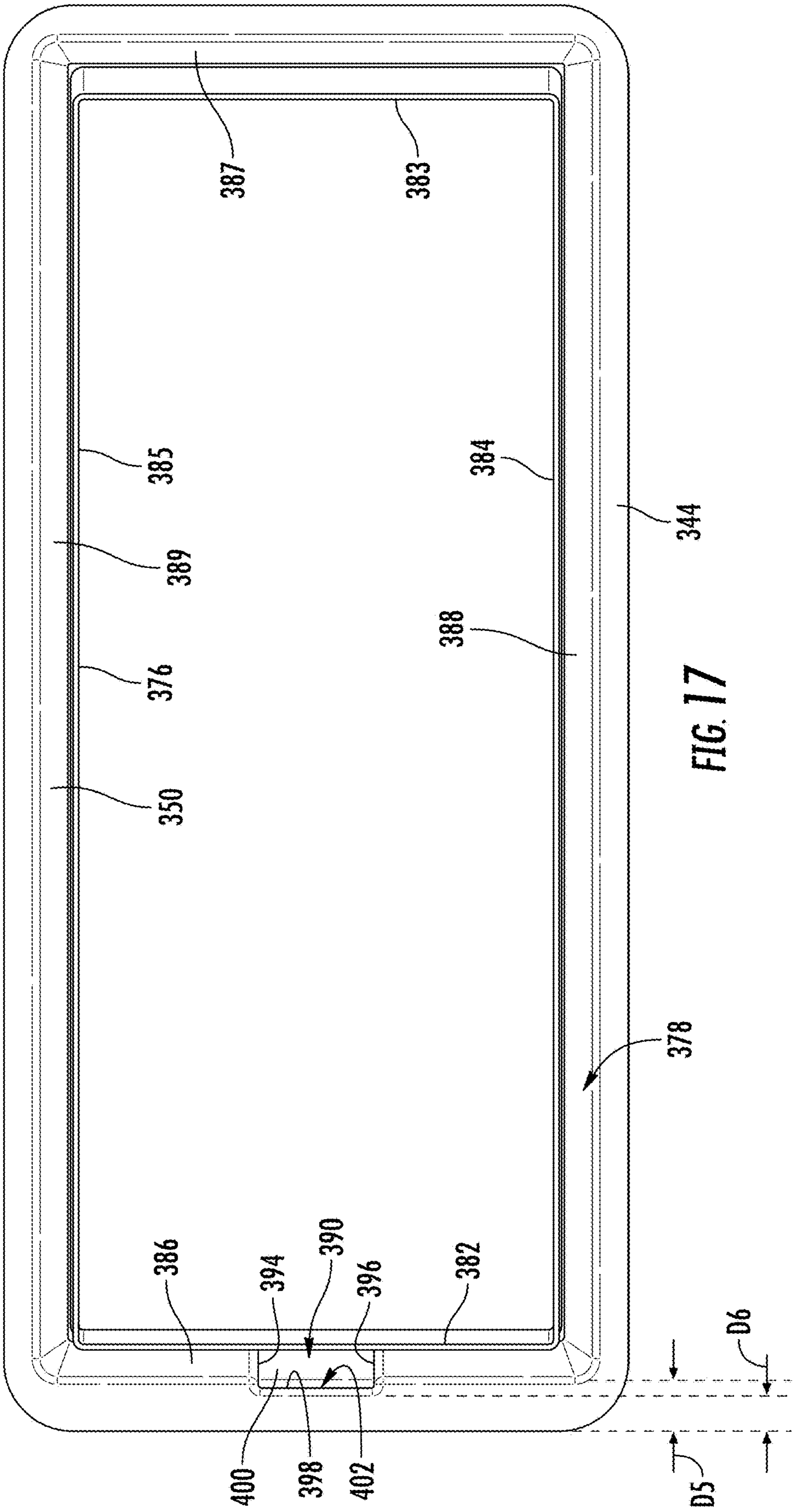
FIG. 17 is a bottom view of the frame of the filter cartridge.

With reference to FIG. 17, second annular wall 376 forms a generally rectangular profile when viewed perpendicular to flow face 324. The rectangular profile is generally formed from four sidewall segments 382-385. Two sidewall segments 382, 383 are parallel to each other and orthogonal to the other two sidewall segments 384, 385, which are in turn parallel to one another. One sidewall segment corresponds to a corresponding side of the filter media pack 312 that extends between the opposed flow faces 322, 324.

Figure 15:
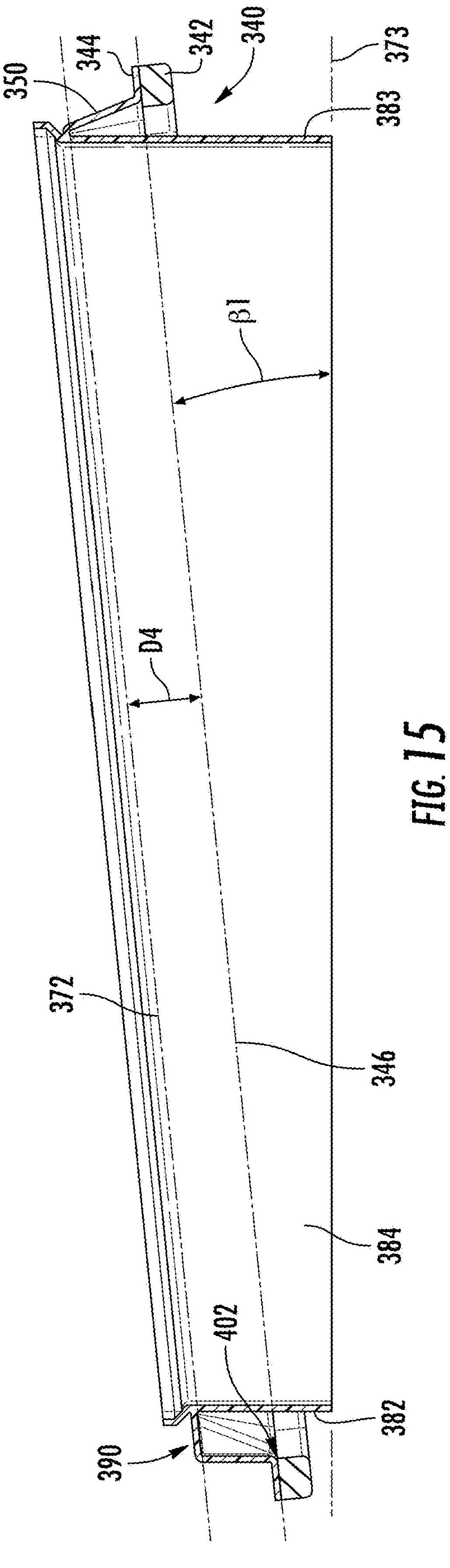
FIG. 15 is a cross-sectional illustration of the frame of the filter cartridge of FIG. 10 take about line 15-15.

With reference to FIG. 15, in this example, sidewall segment 382 has an axial height that is less than sidewall segment 383 measured orthogonal to the inlet and outlet flow faces 324, 322.

Sidewall segments 384, 385 are generally tapered such that they have an increasing height when moving from sidewall segment 382 towards sidewall segment 383. This taper generally corresponds to plane 372 and angle β1.

The free ends of the sidewall segments 382-385 define a plane 373 that is generally planar to the flow faces 322, 324 and plane 348. Planes 346 and 372 are generally at angle β1 relative to planes 373 and the flow faces.

With reference to FIGS. 10 and 17, the annular sidewall 350 also forms a generally rectangular profile and is formed from four interconnected sidewall segments that are arranged in generally parallel sets with the two sets being perpendicular to one another. Sidewall segments 386, 387 are spaced apart and generally parallel to one another and parallel to sidewall segments 382, 383. Sidewall segments 388, 389 spaced apart and generally parallel to one another and parallel to sidewall segments 384, 385. Sidewall segments 388, 389 and extend between sidewall segments 386, 387.

Notably, the portion of the seal 342 and seal support 344 proximate one of the end caps 318 remains at a constant distance from the inlet and outlet flow faces 324, 322 for the entire width of the end cap 318. Similarly, the portion of the seal 342 and seal support 344 proximate the other one of the end caps 318 remains at a constant distance from the inlet and outlet flow faces 324, 322 for the entire width of the end cap 318.

These portions generally extend perpendicular to sides 326, 328 of the filter media pack and extend adjacent the ends of the filter media pack 312 that are sealed by the end caps 318.

However, the portions of the seal 342 and seal support 344 that extend parallel to sides 326 and 328 extend at an angle relative to the inlet and outlet flow faces 324, 322.

Figure 16:
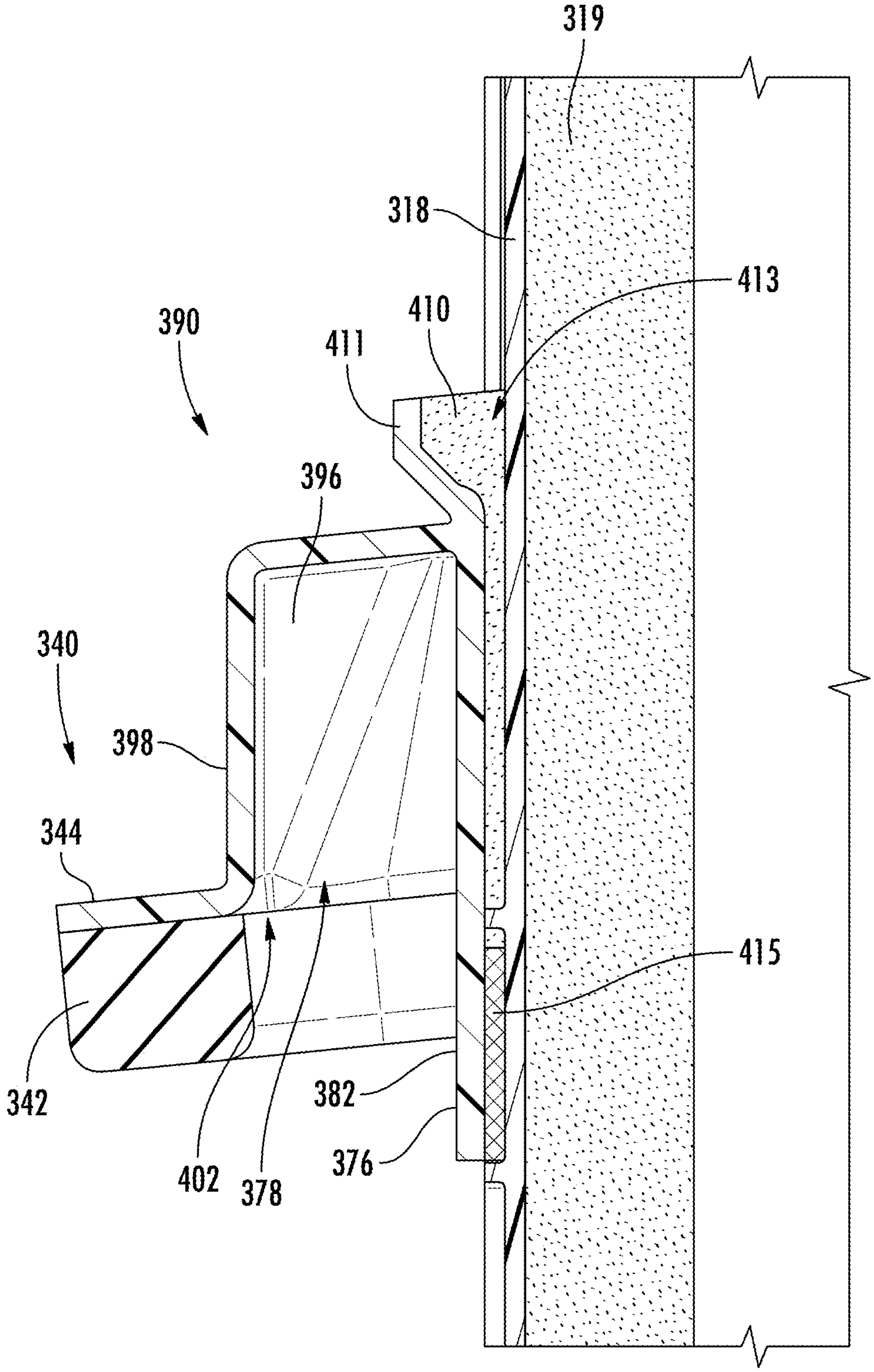
FIG. 16 is a cross-sectional illustration of the filter cartridge of FIG. 10 taken through the enlarged trough region.

With reference to FIGS. 10, 16, and 17, in this example, sidewall segment 386 includes a radially bumped out region forming region 390. Region 390 is spaced radially outward from the rest of sidewall segment 386. The region 390 accepts an axially extending tooth of the housing body when the filter cartridge is installed similar to region 190 of the prior example.

The bottom of the trough 378 proximate region 390 has an enlarged dimension parallel to plane 372 as compared to the rest of the bottom of the trough 378.

The region 390 is formed, at least in part, by a pair of radially outward extending sidewall segments 394, 396 that are generally perpendicular to the rest of sidewall segment 386. These sidewall segments 394, 396 are parallel to one another and extend axially perpendicular to flow faces 322, 342 and planes 346, 372.

A sidewall segment 398 extends between sidewall segments 394, 396. Sidewall segment 398 extends generally orthogonal to sidewall segments 388, 389.

A radially outward extending portion 400 closes an axial end of the region 390. Portion 400, in this example, is generally parallel to and axially spaced from the flange forming seal support portion 344 and planes 346, 372.

The region 390 forms an outward extending notch 402 in seal support portion 344. As such, the dimension D5 of the seal support portion 344 proximate the region 390 is less than the dimension D6 of the seal support spaced away from the region 390.

In this example, as illustrated in FIG. 16, the seal 342 is positioned outward of notch 402.

Seal support portion 344 and annular walls 350, 376 may be considered a frame.

In this example, the frame is attached to the primary filter media pack 312 by an adhesive 410 along the sides 326, 328 and around the outside of end caps 318. The adhesive is positioned, at least in part, between annular wall 376 and the outer surface of the media pack 312 and the outer surface of the end caps 318.

The frame includes an annular wall member 411 that extends axially away from the annular sidewalls 350, 376 and radially outward from the media pack 312 to define an enlarged trough region 413. This enlarged trough region 413 assists in manufacturing and making it easier to apply adhesive 410.

Shutoff tape 415 may be provided at an opposite end of the annular sidewall 376 and located between the annular sidewall 376 and the filter media pack 312 and end caps 318 to close off the gap between the components and prevent leakage of the adhesive 410 prior to curing of the adhesive 410 during assembly.

The enlarged trough region 413 defines a mouth to the gap that has a width measured perpendicular to the depth of the trough that is greater than a width between the second annular sidewall and an adjacent portion of the media pack 312 or an adjacent portion of an end cap 318.

Preferably, the adhesive 410 extends through the filter media and particular portion 321A and also adheres to the support grate 320. In alternative examples, a further adhesive bead may be directly applied between the media and the support grate 320.

Figure 12:
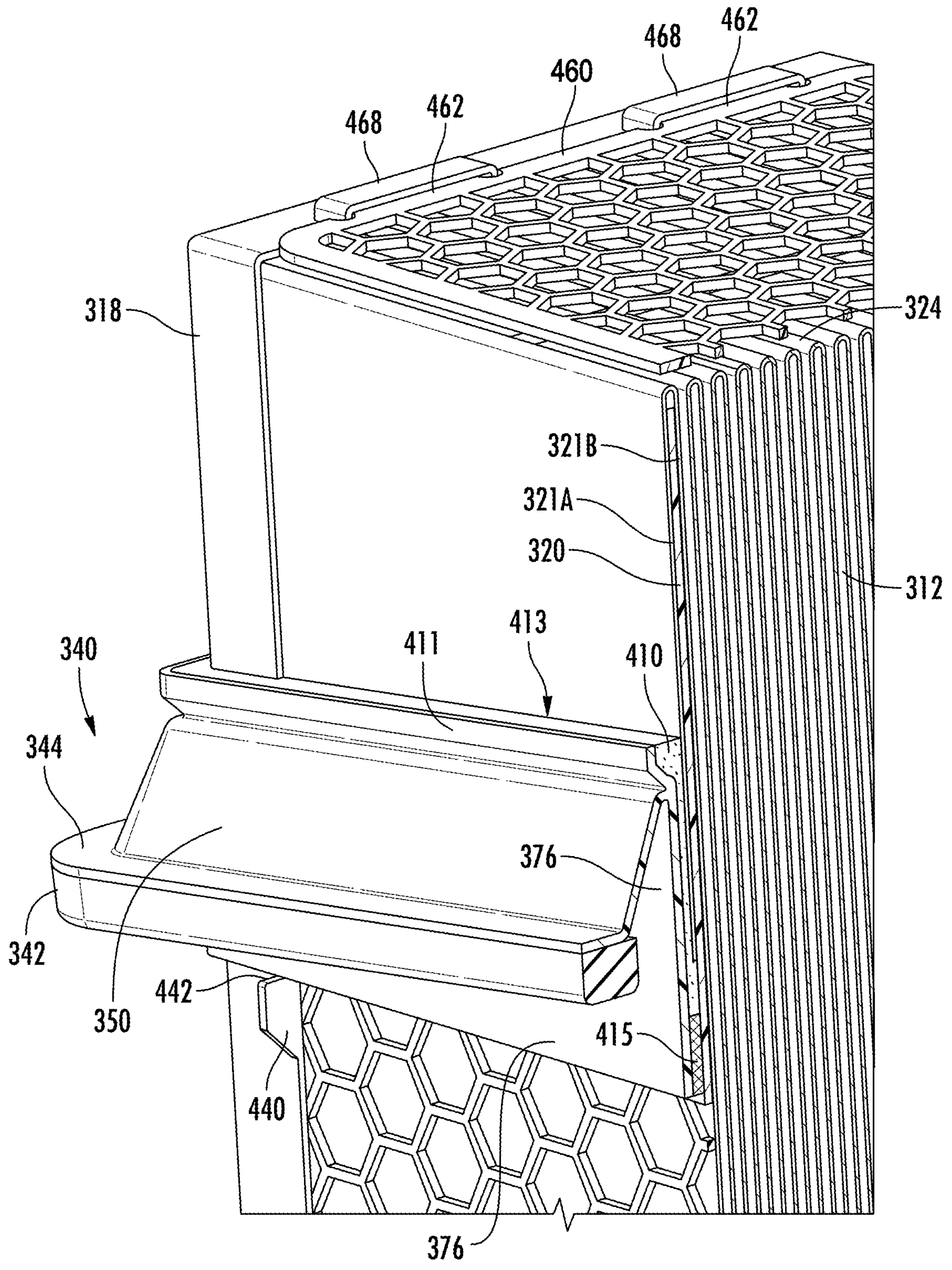
FIG. 12 is a cross-sectional illustration of the filter cartridge of FIG. 10 taken about line 12-12.
Figure 18:
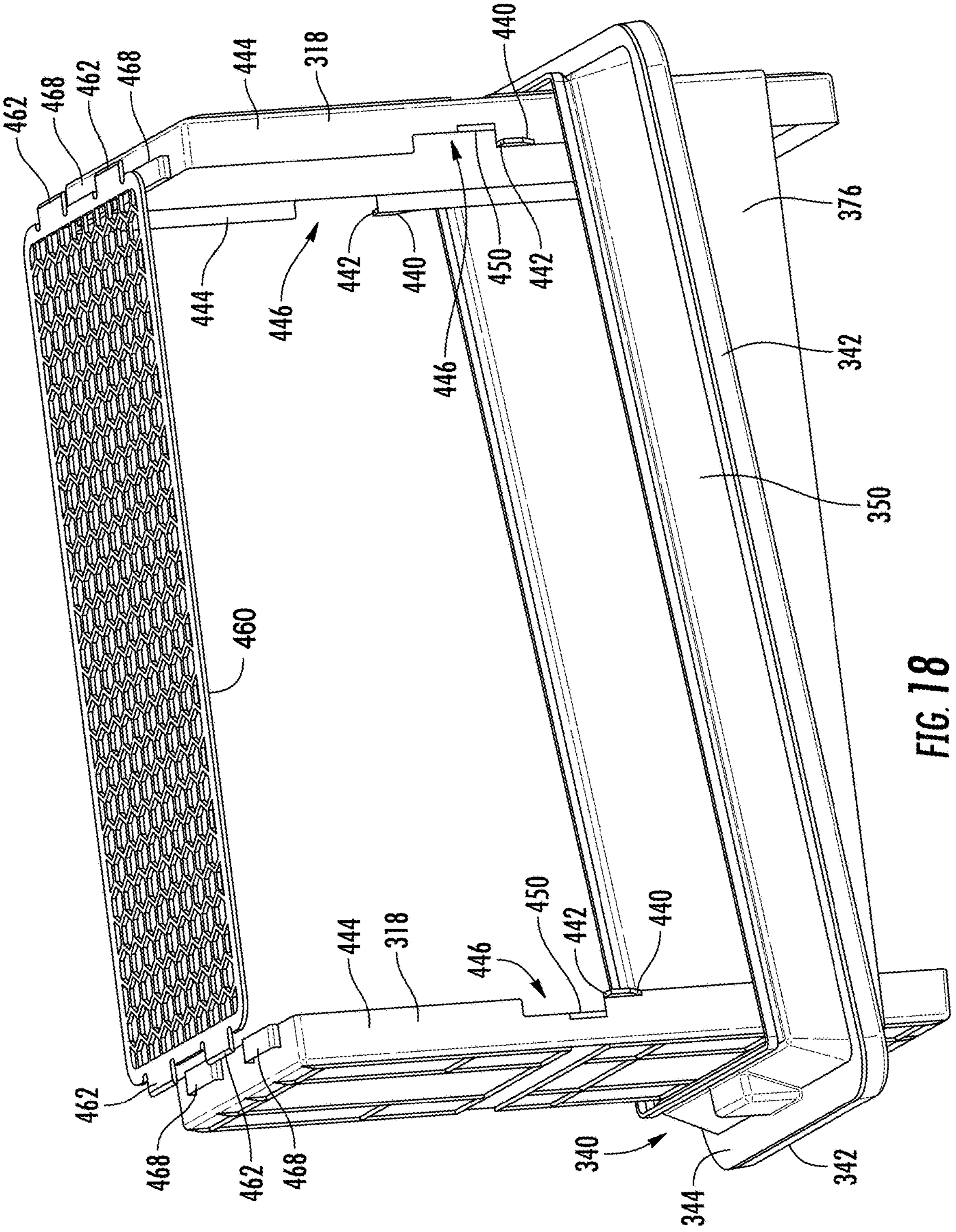
FIG. 18 is partial exploded illustration of components of the filter cartridge of FIG. 10 with the filter media and some adhesive removed for clarity purposes.

With reference to FIGS. 10, 12 and 18, the end caps 318 include outward extending abutment tabs 440 that provide abutments 442. The free end of the annular sidewall 376 axially abut the abutments 442 to align the seal support 340 relative to the media pack 312 and end caps 318.

In addition, with reference to FIG. 18, the end caps 318 include notches 446 formed in sidewalls 444 thereof. The notches 446 preferably provide a region of exposed adhesive 319 that is used to secure the end caps 318 to the filter media pack 312 and to seal the ends of the filter media pack 312. The exposed portion of adhesive 319 provides for an improved seal at the edge of sidewalls 444 of the end cap 318.

Sidewalls 444 also include tapered regions 450 located adjacent the notches 446. The tapered regions 450 reduce in thickness when moving toward the corresponding adjacent notch 446. As such, the free edge of the sidewall 444 proximate the tapered region 450 has a reduced thickness. This reduces the step caused at this location.

The annular sidewall 376 aligns with the notches 446 such that adhesive 410 can contact adhesive 319 during assembly and provide a better seal at that location.

The shutoff tape 415 aligns with the tapered regions and the reduced thickness in this location reduces the step down from the outer surface of the sidewall 444 toward the adhesive 319 located therein or any filter media of filter media pack 312 therein to reduce any potential leak paths.

With reference to FIGS. 10, 12 and 18, an inlet grate 460 is attached proximate the inlet flow face 324. The inlet grate includes a plurality of mounting tabs 462 that extend into mounting receivers 468 of the end caps 318.

The mounting receivers 468 surround recesses or undercuts that secure the inlet grate 460 proximate the inlet flow face 324. In some embodiments, an adhesive may be provided between the mounting tabs 462 and the mounting receivers 468 or pure mechanical connection can be provided.

To increase securement, notches 470 may be provided adjacent the mounting tabs 462 that receive part of the sidewall that defines the mounting receivers 468.

In one example, the adhesive 319 that secures the end caps 318 to the filter media pack 312 does not engage the inlet grate 460.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter cartridge comprising:

a filter media pack having a first flow face and a second flow face;

a housing engagement member that surrounds the filter media pack, the housing engagement member includes first and second annular sidewalls that form a trough therebetween, the trough having a constant depth between a mouth and a bottom of the trough at all locations;

the trough having an enlarged region wherein the bottom of the trough has a greater width dimension than other portions of the bottom of the trough; and wherein:

the housing engagement member includes a seal support and a seal mounted to the seal support;

the seal support defines a first plane and the bottom of the trough defines a second plane;

the first and second planes are parallel to one another; and the depth of the trough being defined by the spacing between the first and second planes.

2. The filter cartridge of claim 1, wherein the first annular sidewall is spaced outward from the second annular sidewall.

3. The filter cartridge of claim 2, wherein a super majority of the trough reduces in width when moving from the mouth thereof towards the bottom thereof.

4. The filter cartridge of claim 1, wherein the bottom of the trough proximate the enlarged region is planar with the second plane.

5. The filter cartridge of claim 4, wherein the enlarged region is formed by a pair of sidewalls that extend orthogonal to and between the first and second plane, the pair of sidewalls being spaced apart and parallel to one another.

6. The filter cartridge of claim 5, wherein a bottom wall defines the bottom of the trough at the enlarged region, the bottom wall extends generally parallel to the second plane and an end wall extends between the first and second planes and orthogonal to the pair of sidewalls.

7. The filter cartridge of claim 4, wherein the seal support is a flange portion that extends radially outward from the first annular sidewall, the first annular sidewall being spaced outward from the second annular sidewall.

8. The filter cartridge of claim 1, wherein the first and second annular sidewalls are generally connected together proximate the bottom of the trough.

9. The filter cartridge of claim 8, wherein the first and second annular sidewalls are formed as a single continuous body formed from a single continuous piece of material.

10. A filter cartridge comprising:

a filter media pack having a first flow face and a second flow face;

a housing engagement member that surrounds the filter media pack, the housing engagement member includes first and second annular sidewalls that form a trough therebetween, the trough having a constant depth between a mouth and a bottom of the trough at all locations;

the trough having an enlarged region wherein the bottom of the trough has a greater width dimension than other portions of the bottom of the trough;

a first end cap secured to a first end of the filter media pack, the first end extending between the first and second flow faces;

a second end cap secured to a second end of the filter media pack, opposite the first end, the second end extending between the first and second flow faces; and wherein the housing engagement member is positioned outward of the first and second end caps.

11. The filter cartridge of claim 10, wherein;

the first end cap includes an outward extending abutment that faces one of the first and second flow faces;

the second end cap includes an outward extending abutment that faces the one of the first and second flow faces;

the second annular sidewall axially abuts the abutment of the first end cap and the abutment of the second end cap.

12. The filter cartridge of claim 11, wherein the abutment of the first end cap and the abutment of the second end cap are spaced a same distance from the one of the first and second flow faces.

13. The filter cartridge of claim 12, wherein:

the second annular sidewall defines a generally rectangular profile having first and second sidewall segments that are parallel to one another and third and fourth sidewall segments that are parallel to one another and generally orthogonal to the first and second sidewall segments;

the first and second sidewall segments having a constant height between the third and fourth sidewall segments;

the third and fourth sidewall segments having an increasing height when moving from the first sidewall segment to the second sidewall segment.

14. The filter cartridge of claim 13, wherein:

a bottom edge of the first, second, third and fourth sidewall segments define a first plane that is generally parallel to the first and second flow faces; and the bottom of the trough defines a second plane, the second plane being non-parallel to the first plane and non-parallel to the first and second flow faces.

15. The filter cartridge of claim 13, wherein the filter media pack has a generally rectangular periphery, the first, second, third and fourth sidewall segments being parallel to a corresponding side of the rectangular periphery of the filter media pack.

16. The filter cartridge of claim 10, further comprising:

a first support grate adjacent the first flow face; and a second support grate adjacent the second flow face, the second support grate being generally U-shaped receiving at least a portion of the filter media pack therein with the second support grate overlapping at least three sides of the filter media pack including the second flow face.

17. The filter cartridge of claim 16, wherein:

the first and second end caps are cup shaped;

the first end cap receives a first end of the filter media pack;

the second end cap receiving a second end of the filter media pack;

a first end of the second support grate is received in the first end cap; and a second end of the second support grate is received in the second end cap.

18. The filter cartridge of claim 17, wherein:

the first support grate includes a first and a second mounting tab extending axially away from one another and located at opposed ends of the first support grate;

the first end cap including a first mounting receiver receiving the first mounting tab therein;

the second end cap including a second mounting receiver receiving the second mounting tab therein.

19. A filter cartridge comprising:

a filter media pack having a first flow face and a second flow face;

a housing engagement member that surrounds the filter media pack, the housing engagement member includes first and second annular sidewalls that form a trough therebetween, the trough having a constant depth between a mouth and a bottom of the trough at all locations;

the trough having an enlarged region wherein the bottom of the trough has a greater width dimension than other portions of the bottom of the trough; and wherein:

the housing engagement member includes an annular wall member that extends outward relative to the second annular sidewall;

the annular wall member and the second annular sidewall forming a gap with the filter media pack;

an adhesive is provided within the gap to secure the housing engagement member to the filter media pack;

the annular wall member defining an enlarged mouth to the gap.

20. The filter cartridge of claim 19, wherein the gap is closed off between the filter cartridge and second annular sidewall by a piece of shutoff tape.

21. A filter system comprising:

a filter housing having a housing body defining an internal cavity, the housing body having a sealing surface extending around the internal cavity, the housing body having an axially extending tooth positioned radially inward of the sealing surface, the tooth extending axially away from the internal cavity axially past the sealing surface; and a filter cartridge comprising:

a filter media pack having a first flow face and a second flow face;

a housing engagement member that surrounds the filter media pack, the housing engagement member includes first and second annular sidewalls that form a trough therebetween, the trough having a constant depth between a mouth and a bottom of the trough at all locations; the trough having an enlarged region wherein the bottom of the trough has a greater width dimension than other portions of the bottom of the trough, the tooth being axially received within the enlarged region of the trough.

* * * * *